US012797998B2

(12) United States Patent
Mas et al.

(10) Patent No.: US 12,797,998 B2
(45) Date of Patent: Nov. 17, 2026

(54) EQUIPEMENT KIT, RECEPTION SUPPORT, MOUNTING DEVICE, METHODS FOR MOUNTING AND DISMOUNTING THE ADAPTER

(71) Applicant: STIRWELD, Saint Gregoire (FR)

(72) Inventors: Pierre Mas, Baden (FR); Gilles Sevestre, Nantes (FR)

(73) Assignee: STIRWELD, Saint Gregoire (FR)

( * ) Notice: Subject to any disclaimer, the term of this patent is extended or adjusted under 35 U.S.C. 154(b) by 0 days.

(21) Appl. No.: 19/115,611

(22) PCT Filed: Oct. 12, 2022

(86) PCT No.: PCT/IB2022/000582
§ 371 (c)(1),
(2) Date: Mar. 26, 2025

(87) PCT Pub. No.: WO2024/079495
PCT Pub. Date: Apr. 18, 2024

(65) Prior Publication Data

US 2026/0102843 A1 Apr. 16, 2026

(51) Int. Cl.
*B23K 20/12* (2006.01)
*B23K 20/26* (2006.01)
*B23Q 1/00* (2006.01)

(52) U.S. Cl.
CPC .......... *B23K 20/1245* (2013.01); *B23K 20/26* (2013.01); *B23Q 1/0072* (2013.01)

(58) Field of Classification Search
CPC .................... B23K 20/12; B23K 20/26; B23Q 1/0072–009; B23Q 3/155; B23Q 3/15553–15566
See application file for complete search history.

(56) References Cited

U.S. PATENT DOCUMENTS 7,448,526 B2 11/2008 Haynie
9,469,000 B2 * 10/2016 Schacht ............... B23Q 1/0072
10,835,988 B2 * 11/2020 Uemura ............... B23K 20/123
2005/0178816 A1 8/2005 Stevenson

FOREIGN PATENT DOCUMENTS

EP 3389913 A1 10/2018

* cited by examiner

*Primary Examiner* — Tyrone V Hall, Jr.
(74) *Attorney, Agent, or Firm* — Thomas Horstemeyer LLP

(57) ABSTRACT

The invention relates to an equipment kit (100, 400) for mounting and dismounting a friction stir welding head (1), the equipment kit comprising an adapter (100) intended to be fixed to the head (1) and an interface (400) intended to be fixed to a chassis (300) of a rotating driving machine (C), characterized in that one of the second surface (103) of the adapter (100) and of the interface (400) has actuatable gripping clamps (105) having each a gripping position for gripping pull tabs (402) of the other one of the second surface (103) of the adapter (100) and of the interface (400) and a releasing position for releasing the pull tabs (402).

19 Claims, 16 Drawing Sheets

EQUIPEMENT KIT, RECEPTION SUPPORT, MOUNTING DEVICE, METHODS FOR MOUNTING AND DISMOUNTING THE ADAPTER

CROSS REFERENCE TO RELATED APPLICATIONS

This application is the 35 U.S.C. § 371 national stage application of PCT Application No. PCT/IB2022/000582, filed Oct. 12, 2022, which is hereby incorporated by reference herein in its entirety.

The invention concerns an equipment kit for mounting and dismounting a friction stir welding head on a chassis of a rotating driving machine, a reception support for receiving the assembly of the equipment kit, a mounting device, a method for mounting the friction stir welding head on the chassis and a method for dismounting the friction stir welding head from the chassis.

A field of application of the invention relates to machine tools as rotating driving machine, for example numerically-controlled machine tools.

The rotating driving machine is intended to drive in rotation an axis of the friction stir welding head having been mounted on the chassis of the rotating driving machine, in order to drive in rotation a tool fixed to the axis to perform an operation. Particularly, the invention aims to be able to perform friction stir welding using a machine tool having a rotating spindle rotated by a motor of the machine.

One problem of the friction stir welding heads is that they need to be manually mounted on the chassis of the rotating driving machine and manually dismounted from the chassis of the rotating driving machine, which takes much time and is tiring, for example when one needs to change the friction stir welding head.

A goal of the invention is to solve this problem and to automate the equipment kit, the reception support, the mounting device, the method for mounting the friction stir welding head on the chassis and the method for dismounting the friction stir welding head from the chassis.

To this end, a first subject matter of the invention is an equipment kit for mounting and dismounting a friction stir welding head, the equipment kit comprising an adapter intended to be fixed to the friction stir welding head and an interface intended to be fixed to a chassis of a rotating driving machine, wherein the adapter comprises a body having a first surface having fasteners intended to be secured to the friction stir welding head and a second surface situated at a first prescribed distance not null from the first surface, characterized in that one of the second surface of the adapter and of the interface has actuatable gripping clamps having each a gripping position for gripping pull tabs of the other one of the second surface of the adapter and of the interface and a releasing position for releasing the pull tabs.

Thanks to the invention, the mounting and demounting is automated through the clamps.

In embodiments of the invention, the second surface of the adapter has the actuatable gripping clamps, and the interface has the pull tabs, wherein the adapter further comprises an actuation connector to open the actuatable clamps from the gripping position to the releasing position and to close the actuatable clamps from the releasing position to the gripping position, wherein the actuation connector is able be actuated to take one of a gripping actuation state, in which the gripping actuatable clamps are in the gripping position, and of a release actuation state, in which the gripping actuatable clamps are in the releasing position, wherein the actuation connector is attached to the body and is accessible from the outside.

Thanks to these embodiments of the invention, the mounting and demounting is automated through the actuation connector being in contact with the outside as a function of the position of the adapter, which may be disposed in different locations actuating differently the actuation connector. So the localization of the adapter directly actuates the actuation connector.

According to an embodiment of the invention, the body comprises outer walls attached on the one hand to the first surface and on the other hand to the second surface, the actuation connector is fixed to one of the outer walls and has an actuation input oriented according to a prescribed reception direction going from the second surface to the first surface.

According to an embodiment of the invention, the adapter comprises at least one rim protruding laterally to the outside from the first surface, wherein the rim has at least one recess for centering the adapter, wherein the recess is oriented according to a prescribed reception direction going from the second surface to the first surface.

According to an embodiment of the invention, the actuatable gripping clamps are actuatable by pressurized fluid.

According to an embodiment of the invention, the actuatable gripping clamps are actuatable by pressurized fluid from the actuation connector, wherein the actuation connector has an actuation input for receiving the pressurized fluid, wherein the adapter has channels for sending the pressurized fluid from the actuation connector to the actuatable gripping clamps, wherein an absence of the pressurized fluid in the actuation input corresponds to the gripping actuation state of the actuation connector, wherein a presence of the pressurized fluid in the actuation input corresponds to the release actuation state of the actuation connector.

According to another embodiment of the invention, the actuatable gripping clamps are electrically or electro-mechanically actuatable.

In other embodiments of the invention, the interface has the actuatable gripping clamps and the second surface of the adapter has the pull tabs.

According to an embodiment of the invention, the equipment kit further comprises a friction stir welding head secured by the fasteners to the first surface of the adapter.

A second subject matter of the invention is an assembly comprising the adapter as described above and a friction stir welding head secured by the fasteners to the first surface of the adapter.

According to an embodiment of the invention, the friction stir welding head has an upper wall secured by the fasteners to the second surface of the adapter, a first lateral wall fixed to the upper wall on the right and a second lateral wall fixed to the upper wall on the left, wherein the upper wall has a first shoulder protruding laterally to the outside to the right from the first lateral wall and a second shoulder protruding laterally to the outside to the left from the second lateral wall, the first shoulder and the second shoulder serving as contact surfaces for the assembly in a prescribed reception position of the assembly.

According to an embodiment of the invention, the friction stir welding head has an upper wall secured by the fasteners to the second surface of the adapter, a first lateral wall fixed to the upper wall on the right and a second lateral wall fixed to the upper wall on the left, wherein the first surface of the adapter has a first shoulder protruding laterally to the outside to the right from the first lateral wall and a second shoulder protruding laterally to the outside to the left from the second lateral wall, the first shoulder and the second shoulder serving as contact surfaces for the assembly in a prescribed reception position of the assembly.

A third subject matter of the invention is a reception support for receiving the assembly of the equipment kit as described above, wherein the reception support comprises a support and struts, which are secured to the support to maintain the support at a second prescribed distance from ends of the struts, wherein the support has a reception surface intended to be in contact with the contact surfaces of the assembly in the prescribed reception position of the assembly, wherein the support has an opening and a space connected to the opening is provided between the struts, to house the friction stir welding head in the opening and in the space in the prescribed reception position of the assembly.

According to an embodiment of the invention, the reception support comprises a triggering connector, which is attached to the support and which is accessible from the outside, wherein in the prescribed reception position of the assembly relatively to the reception surface the triggering connector is in contact with the actuation connector and is able to control the actuation connector in one of the gripping actuation state and of the release actuation state.

According to an embodiment of the invention, the support has a free surface, which is distant from the reception surface, wherein the triggering connector is situated on the free surface of the support and has an actuation output oriented against a prescribed reception direction.

According to an embodiment of the invention, the support has a first protruding stop delimiting towards the outside the reception surface to the right and a second protruding stop delimiting towards the outside the reception surface to the left.

According to an embodiment of the invention, the reception support has at least one centering pin, which is protruding from the reception support against a prescribed reception direction and which is intended to be inserted in at least one recess of the adapter in the prescribed reception position of the assembly relatively to the reception surface.

According to an embodiment of the invention, the triggering connector has an actuation output, which is oriented against a prescribed reception direction going from the second surface to the first surface and which is in contact with an input port of the actuation connector in the prescribed reception position of the assembly relatively to the reception surface.

According to an embodiment of the invention, the triggering connector has an actuation output, which is connected in a fluid tight manner to the actuation input of the actuation connector in the prescribed reception position of the assembly relatively to the reception surface.

According to an embodiment of the invention, the reception support comprises at least one first sensor for sensing that the assembly is in the prescribed reception position relatively to the reception surface.

According to an embodiment of the invention, the reception support comprises at least one second sensor for sensing that an interface intended to be fixed to the chassis of the rotating driving machine is at less than a third prescribed distance being not null from the second sensor.

According to an embodiment of the invention, the reception support is part of an installation comprising a source of pressurized fluid, a conduit for transporting the pressurized fluid from the source to the actuation output and a source controller for controlling the sending of the pressurized fluid from the source to the conduit, wherein the source controller is configured to control the source for a determined duration being not null in a sending position corresponding to the release actuation state of the actuation connector, in which the source sends the pressurized fluid to the actuation output, when both of a first condition in which the at least one first sensor senses that the assembly is in the prescribed reception position relatively to the reception surface, and a second condition, in which the second sensor senses that the interface intended to be fixed to the chassis of the rotating driving machine is at less than the third prescribed distance from the second sensor, are met, wherein the source controller is configured to control the source in an interrupting position corresponding to the gripping actuation state of the actuation connector, in which the source does not send the pressurized fluid to the actuation output, when the first condition is not met and/or the second condition is not met.

A fourth subject matter of the invention is a mounting device comprising the equipment kit as described above and the reception support as described above.

According to an embodiment of the invention, the pull tabs are attached to and protrude from the interface and are able to be inserted in the actuatable clamps, when the actuatable clamps are in the release position, wherein in the gripping position the actuatable clamps are configured to grip the pull tabs inserted in the actuatable clamps.

According to an embodiment of the invention, the third prescribed distance is higher than a fourth prescribed distance, which is present from the interface to the second sensor in the prescribed reception position of the assembly relatively to the reception surface, when the actuatable clamps are in the gripping position of the pull tabs.

A fifth subject matter of the invention is a method for mounting a friction stir welding head on a chassis of a rotating driving machine, using a mounting device as described above, wherein the interface is initially fixed to the chassis of the rotating driving machine at a distance not null from the adapter and the assembly is initially in contact with the reception surface of the reception support in the prescribed reception position, wherein the method comprises the following steps:

moving the chassis of the rotating driving machine and the reception support one relative to the other, so that the interface faces the second face of the adapter, controlling the triggering connector to put the actuation connector in the release actuation state for a determined duration being not null, inserting the pull tabs of the interface in the actuatable clamps of the adapter during the determined duration, controlling the triggering connector to put the actuation connector in the gripping actuation state after the determined duration, moving the chassis of the rotating driving machine and the reception support one relative to the other, so that the chassis of the rotating driving machine with the adapter secured to the interface is away from the reception support.

According to an embodiment of the invention, said controlling is triggered by the second sensor sensing that the interface is at less than the third prescribed distance being not null from the second sensor.

A sixth subject matter of the invention is a method for dismounting a friction stir welding head from a chassis of a rotating driving machine, using a mounting device as described above, wherein the interface is initially fixed to the chassis of the rotating driving machine and the adapter is initially secured to the interface by the fact that the actuatable gripping clamps of the adapter are initially gripping the pull tabs of the interface in the gripping position, and wherein the assembly is not initially in the prescribed reception position relatively to the reception surface, wherein the method comprises the following steps:

moving the chassis of the rotating driving machine and the reception support one relative to the other, so that the assembly is in contact with the reception surface in the prescribed reception position of the assembly, controlling the triggering connector to put the actuation connector in the release actuation state for a determined duration being not null, moving the chassis of the rotating driving machine and the reception support one relative to the other, to bring the pull tabs of the interface away from the actuatable clamps of the adapter during the determined duration.

According to an embodiment of the invention, said controlling is triggered by the first sensor sensing that the assembly is in the prescribed reception position relatively to the reception surface.

The invention will be better understood upon reading the following description, given only by way of non-limiting example with reference to the figures below of the appended drawings.

Figure 1A:
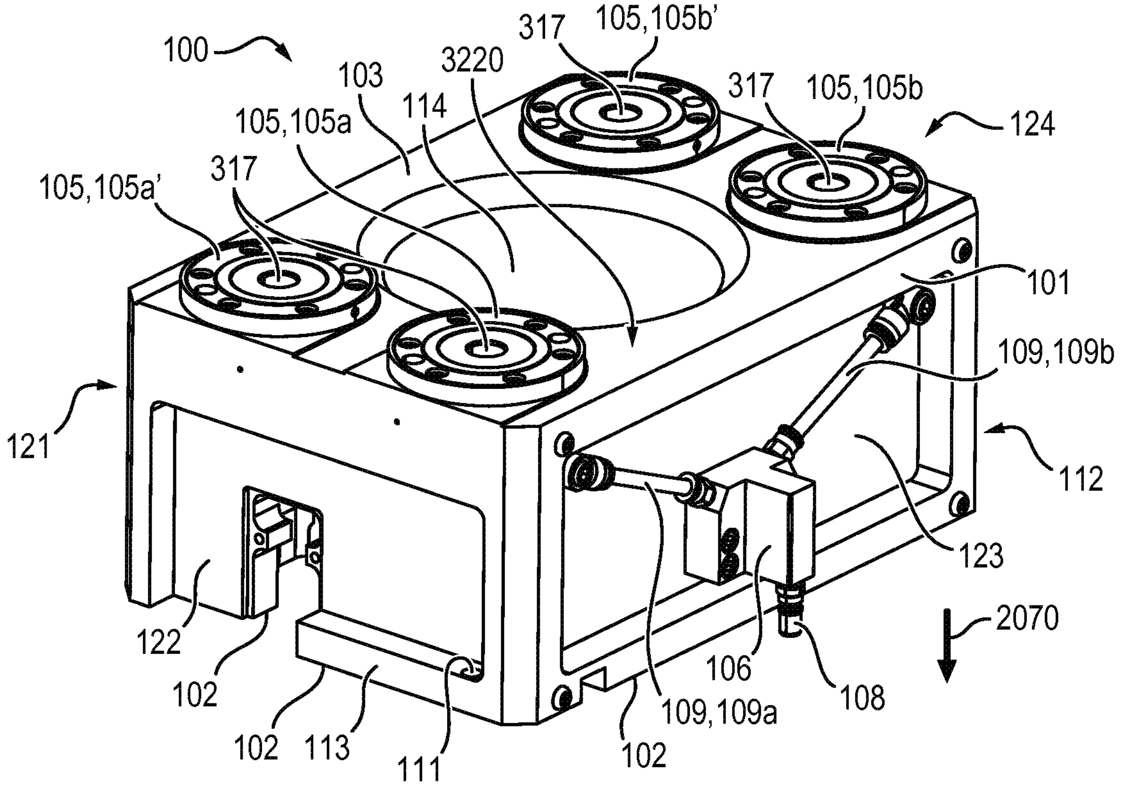
FIGS. 1A and 1B represent schematic perspective views of an adapter.
Figure 1B:
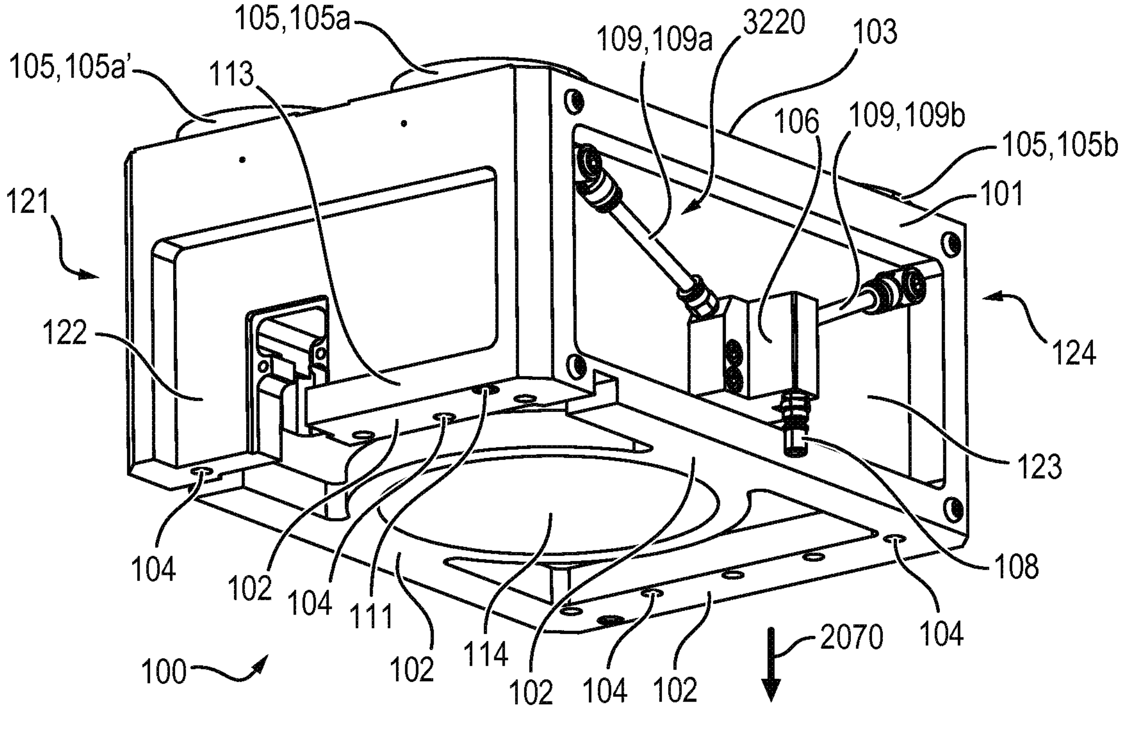
Figure 1C:
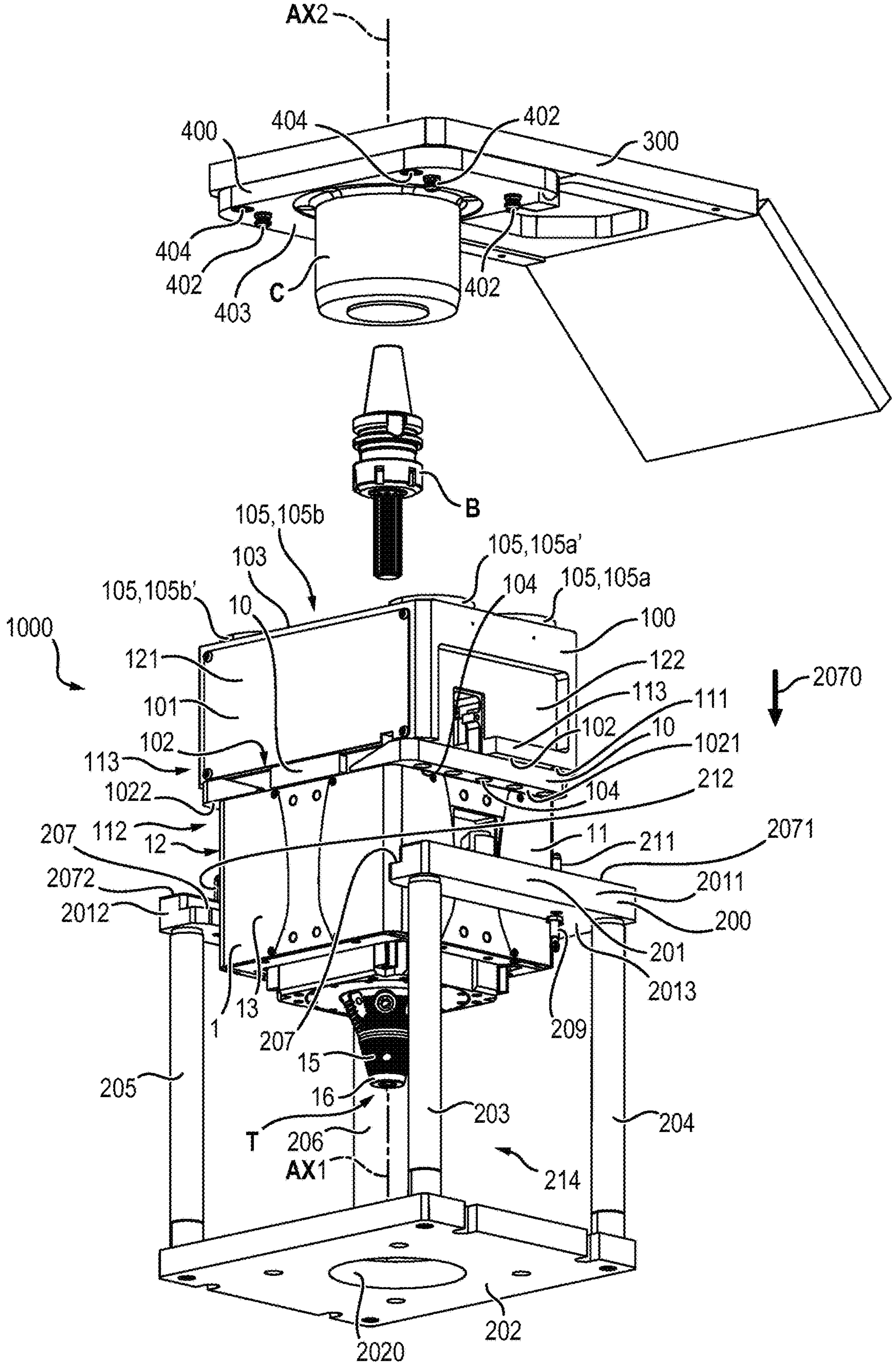
FIG. 1C represents an exploded schematic perspective view of an interface, an adapter, a reception support and a friction stir welding head according to embodiments of the invention.

In the FIGS. 1A, 1B, 1C, 2, 3A, 3B, 3C, 3D, 3E, 4A, 4B, 4C, 5, 6, 7, 8 are shown an adapter 100 (or adaptation device 100 or mounting device 100), a reception support 200 (or cradle 200 ou support device 200) and an interface 400 (or interface device 400) according to embodiments of the invention. The adapter 100 and/or the reception support 200 and/or the interface 400 may form an equipment kit that can be used with a friction stir welding head 1 already existing and with a rotating driving machine C already existing. A mounting device may comprise the equipment kit and the reception support 200.

The equipment kit is provided for mounting and dismounting the friction stir welding head 1. The adapter 100 is intended to be fixed to the friction stir welding head 1. The interface 400 is intended to be fixed to a chassis 300 of a rotating driving machine C.

The adapter 100 comprises a body 101 having a first surface 102 (for example lower surface 102 in the figures) having fasteners 104 (for example bolts 104 or other), which have to be secured to a surface 10 (for example upper wall 10 in the figures) of the friction stir welding head 1. In the description below, the adapter 100 is fixed to the friction stir welding head 1 and thus forms an assembly 1000, by which the friction stir welding head 1 is moved in the same way as the adapter 100.

The interface 400 has fasteners 404 (for example bolts 404 or other) secured to the chassis 300 of the rotating driving machine C. In the description below, the interface 400 is fixed to the chassis 300 of the rotating driving machine C and is moved in the same way as the chassis 300 of the rotating driving machine C.

Figure 4A:
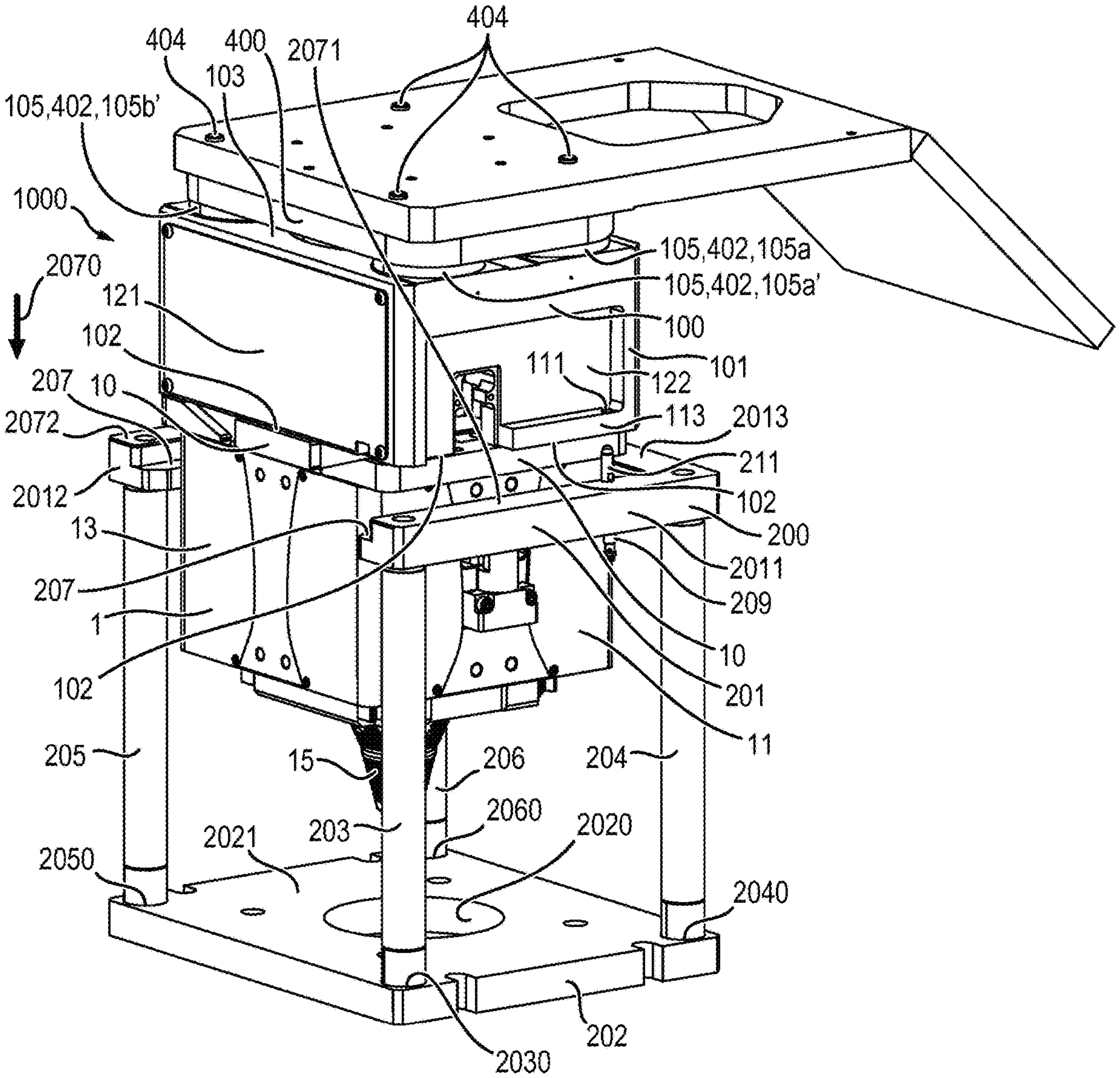
FIG. 4A represents a schematic perspective view of the interface, the adapter, the reception support and the friction stir welding head according to embodiments of the invention, in an intermediate position of the head and in a mounting position of the adapter.
Figure 4B:
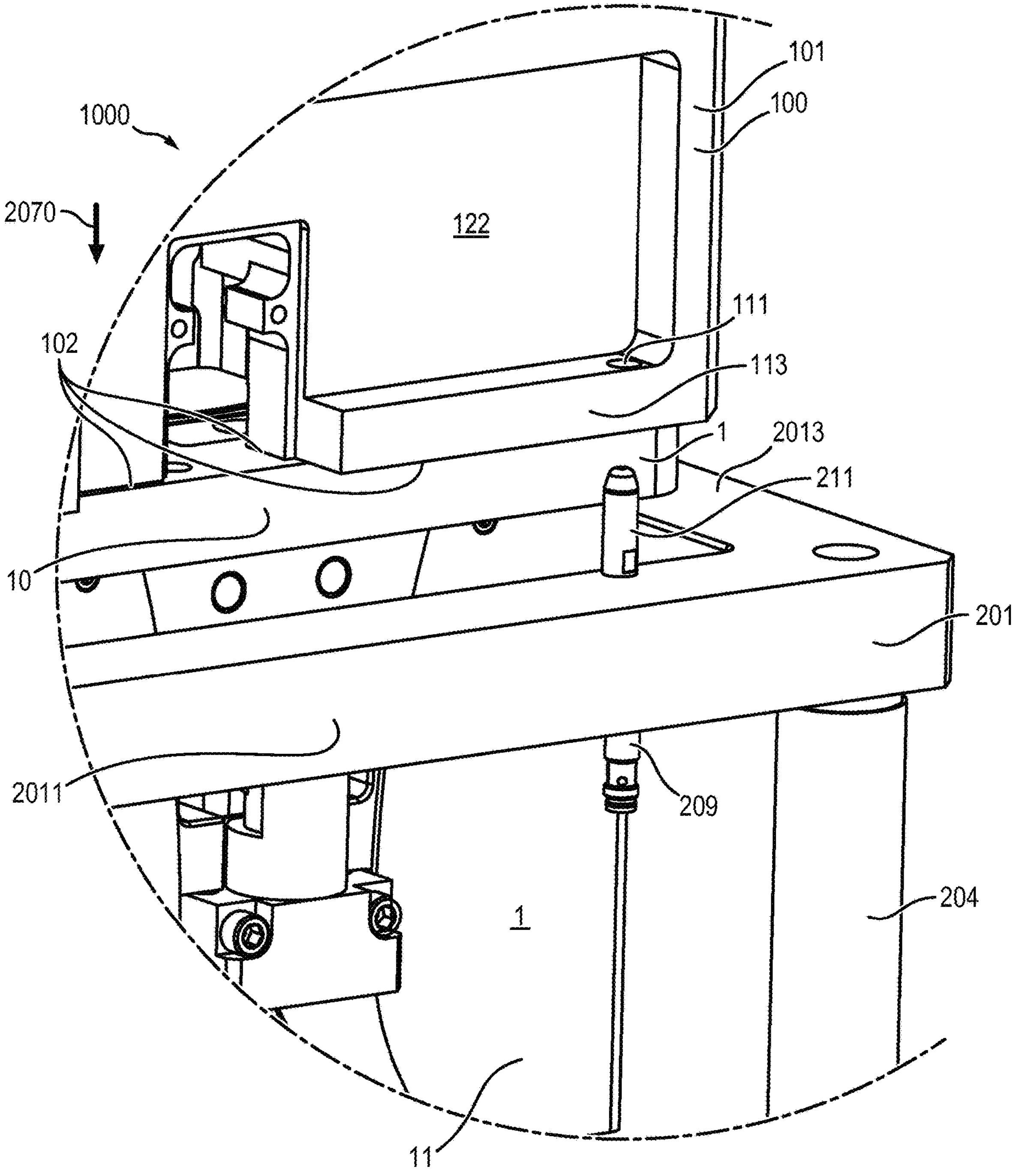
FIG. 4B represents an enlarged schematic perspective view of the interface, the adapter, the reception support and the friction stir welding head according to embodiments of the invention, in a mounting position of the adapter and in an intermediate position of the head from the reception support.
Figure 4C:
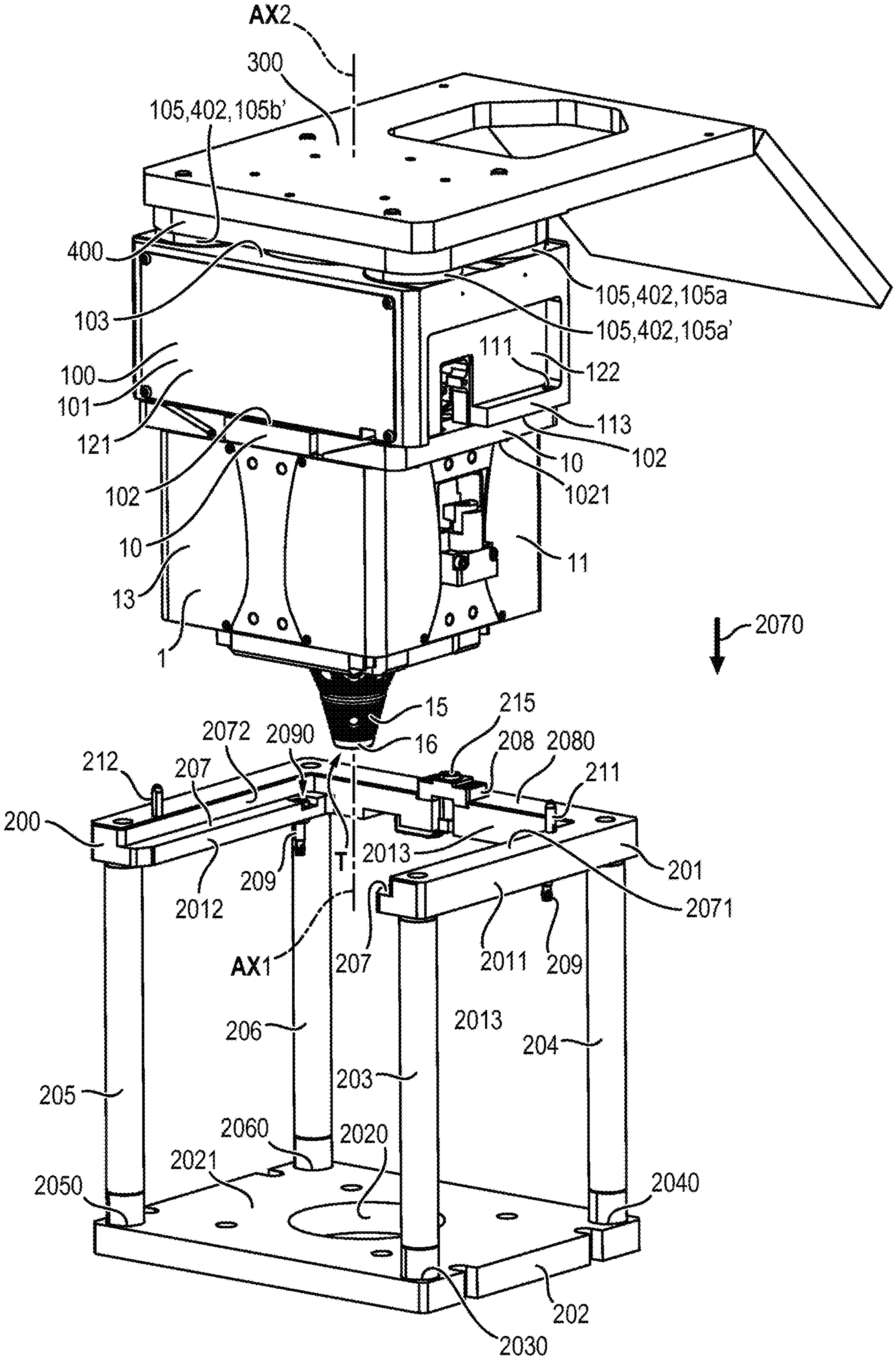
FIG. 4C represents a schematic perspective view of the interface, the adapter, the reception support and the friction stir welding head according to embodiments of the invention, in a mounting position of the adapter and in a distant position of the head from the reception support.
Figure 5:
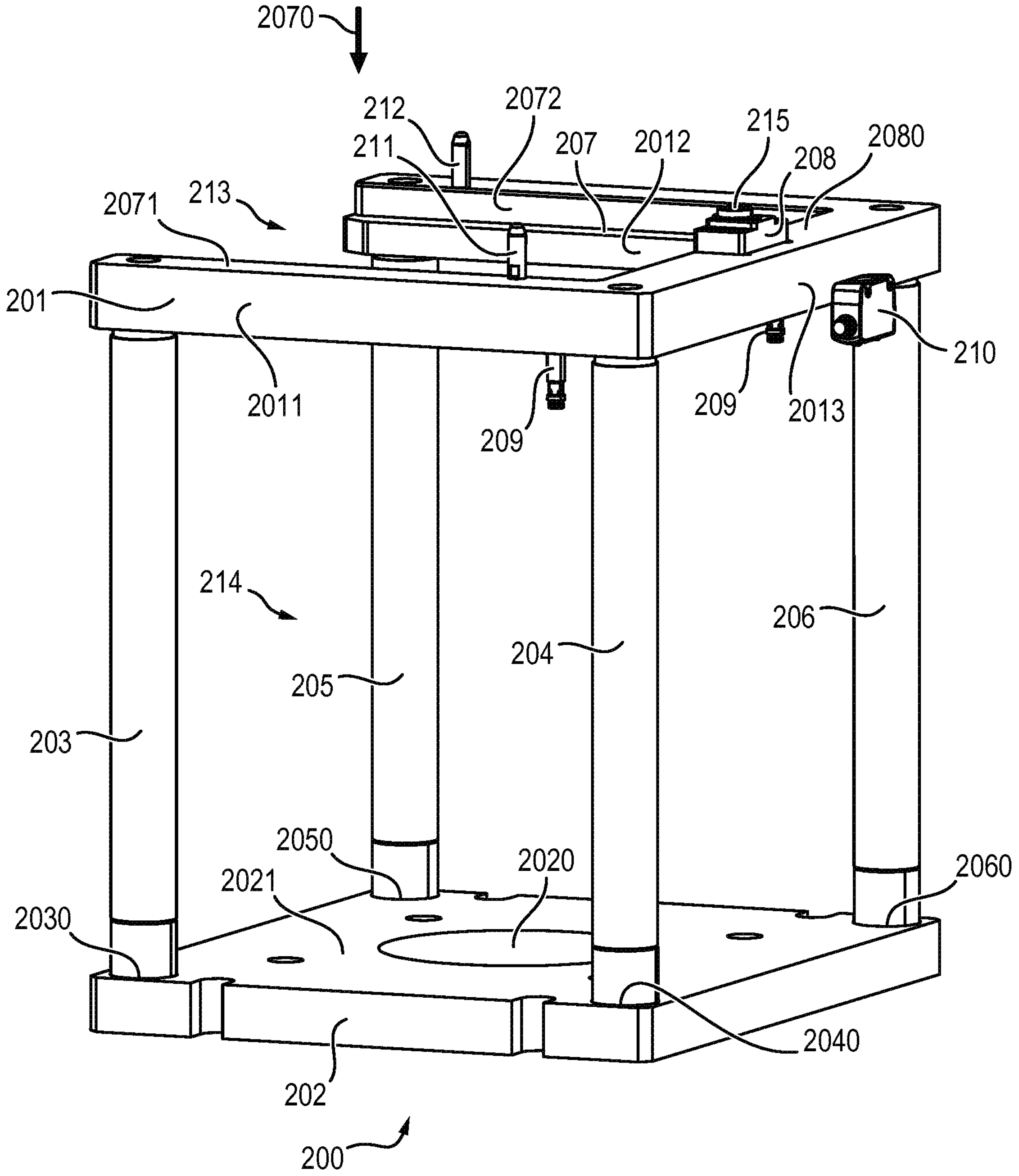
FIG. 5 represents a schematic perspective view of the reception support according to embodiments of the invention.

The adapter 100 may be fixed to the interface 400 in a mounting position, as shown in FIGS. 4A, 4B and 4C.

Figure 2:
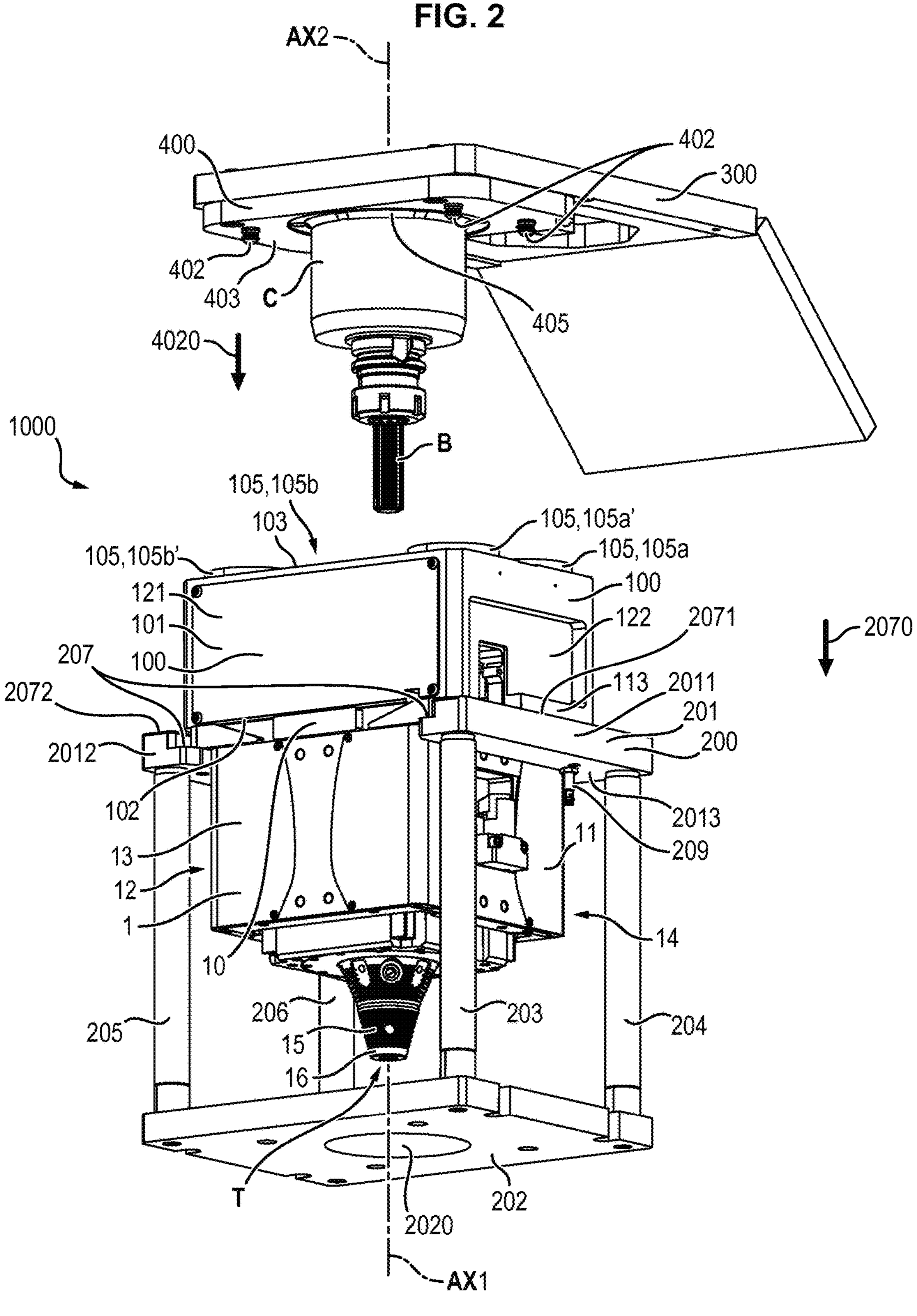
FIG. 2 represents a schematic perspective view of the interface, the adapter, the reception support and the friction stir welding head according to embodiments of the invention, in a prescribed reception position of the head and in a dismounting position of the adapter.
Figure 3A:
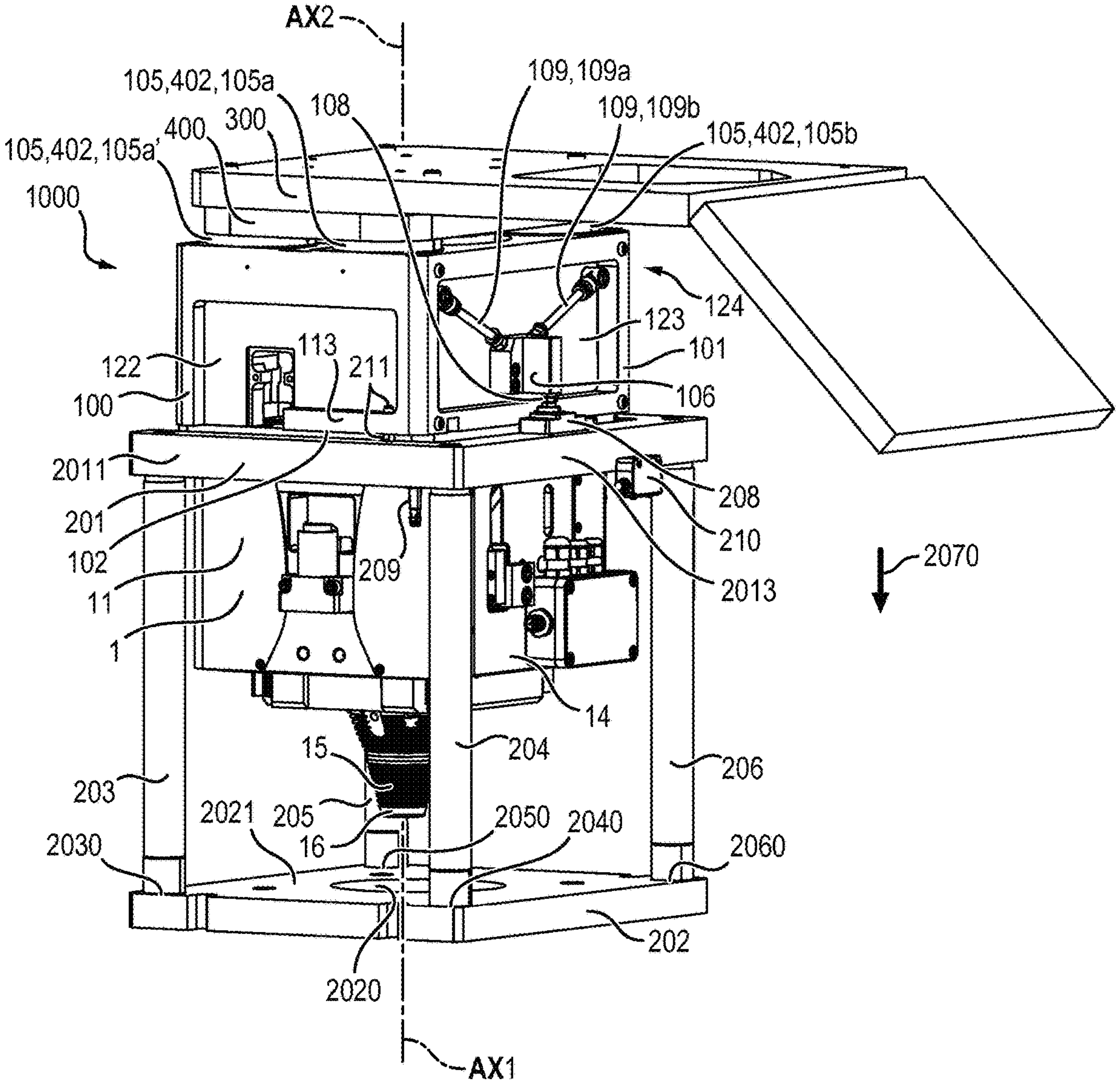
FIG. 3A represents a schematic perspective view of the interface, the adapter, the reception support and the friction stir welding head according to embodiments of the invention, in the prescribed reception position of head.
Figure 3B:
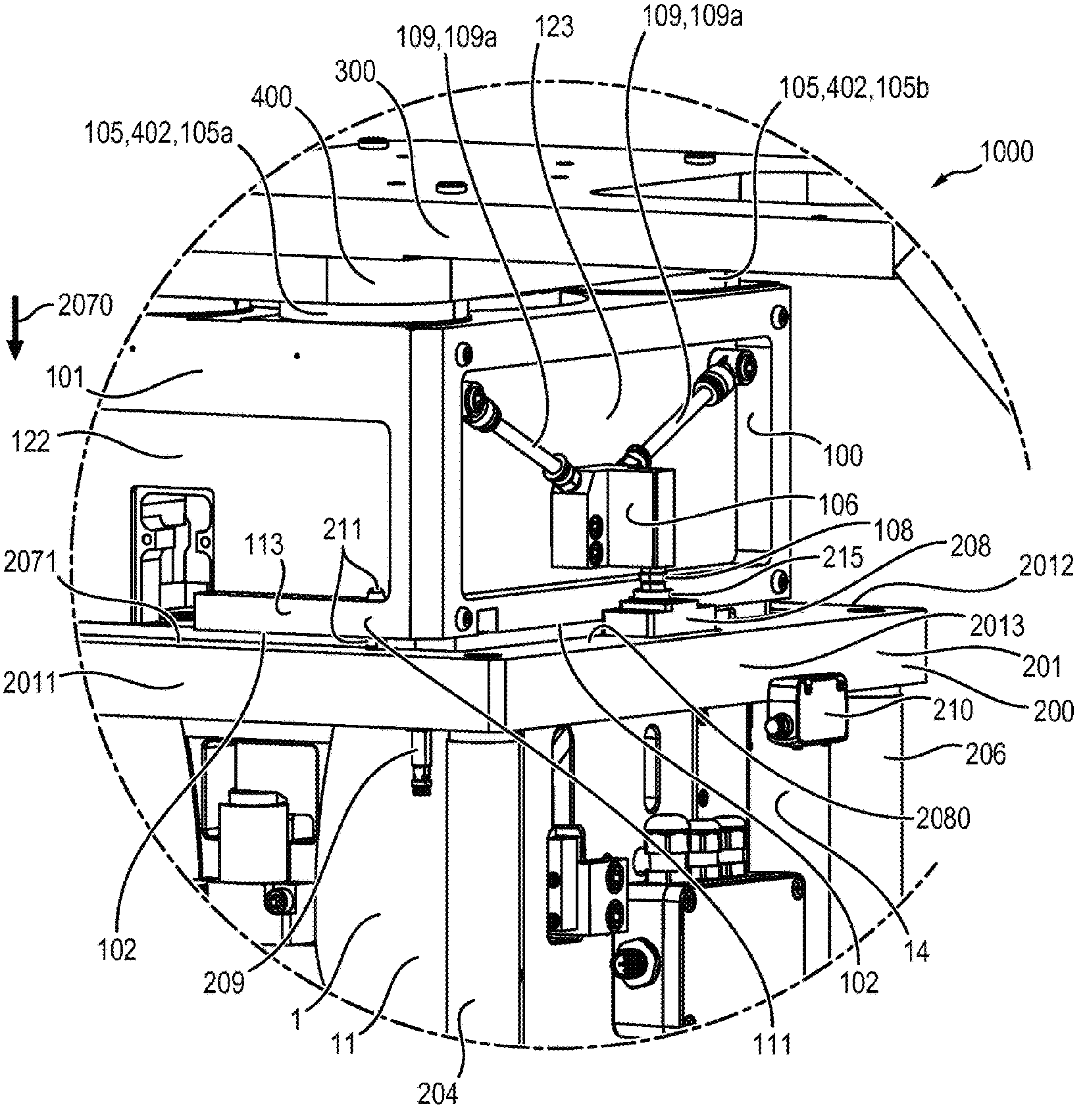
FIG. 3B represents an enlarged schematic perspective view of the interface, the adapter, the reception support and the friction stir welding head according to embodiments of the invention, in the prescribed reception position of the head of FIG. 3A.
Figure 3C:
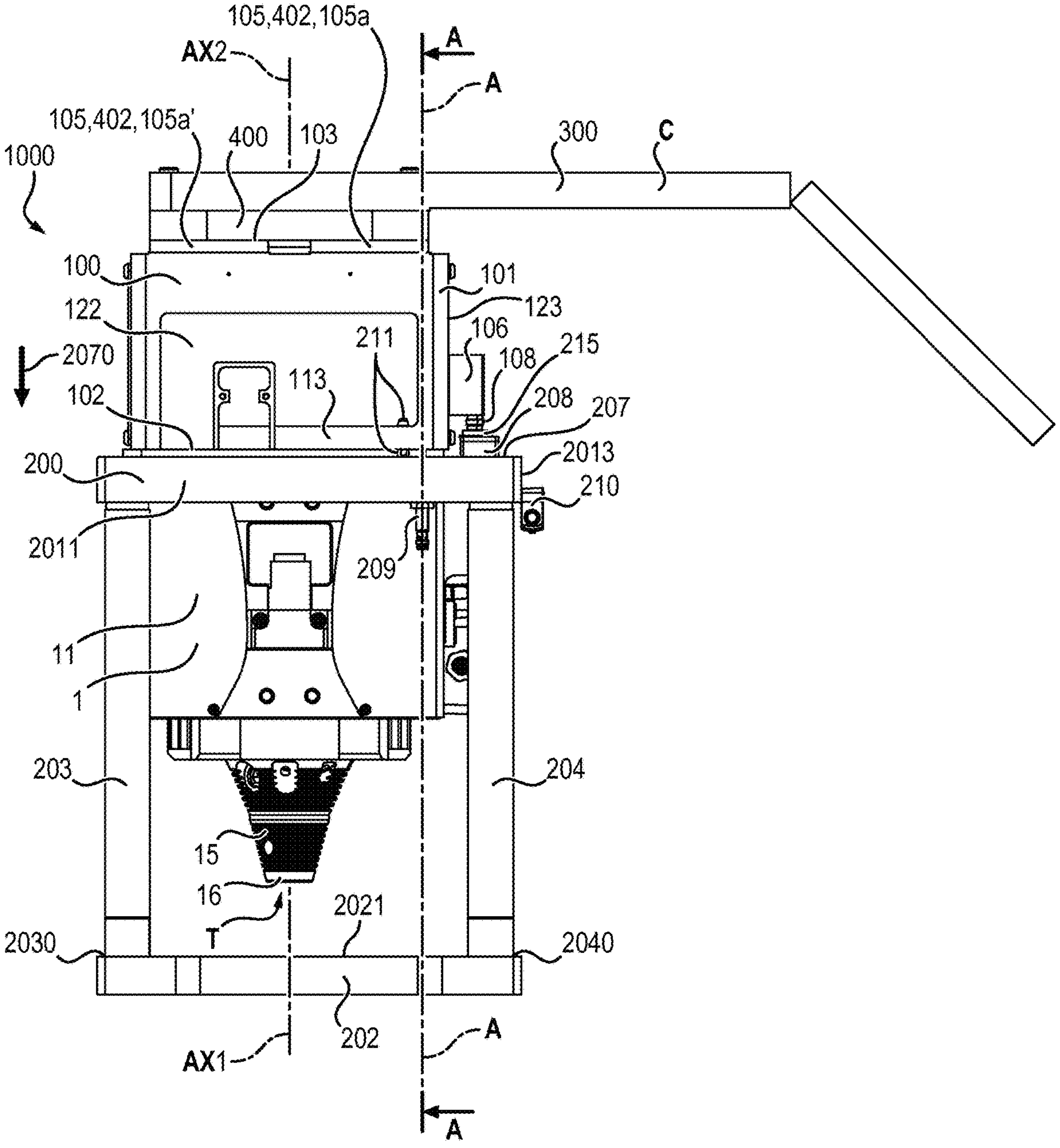
FIG. 3C represents a schematic side view of the interface, the adapter, the reception support and the friction stir welding head according to embodiments of the invention, in the prescribed reception position of the head of FIG. 3A.
Figure 3D:
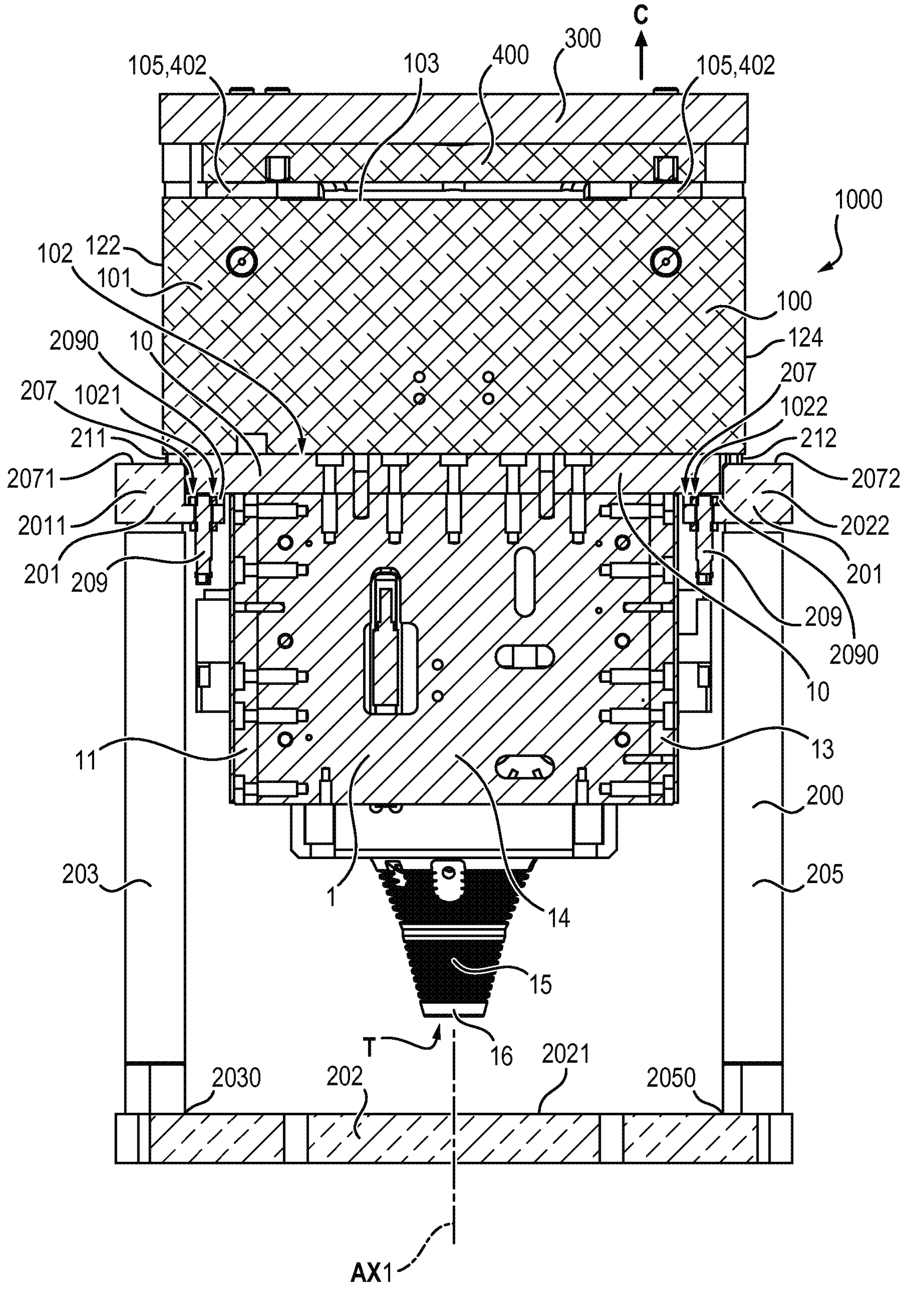
FIG. 3D represents a schematic cross section of the interface, the adapter, the reception support and the friction stir welding head according to embodiments of the invention across the section plane A shown on FIG. 3C.
Figure 3E:
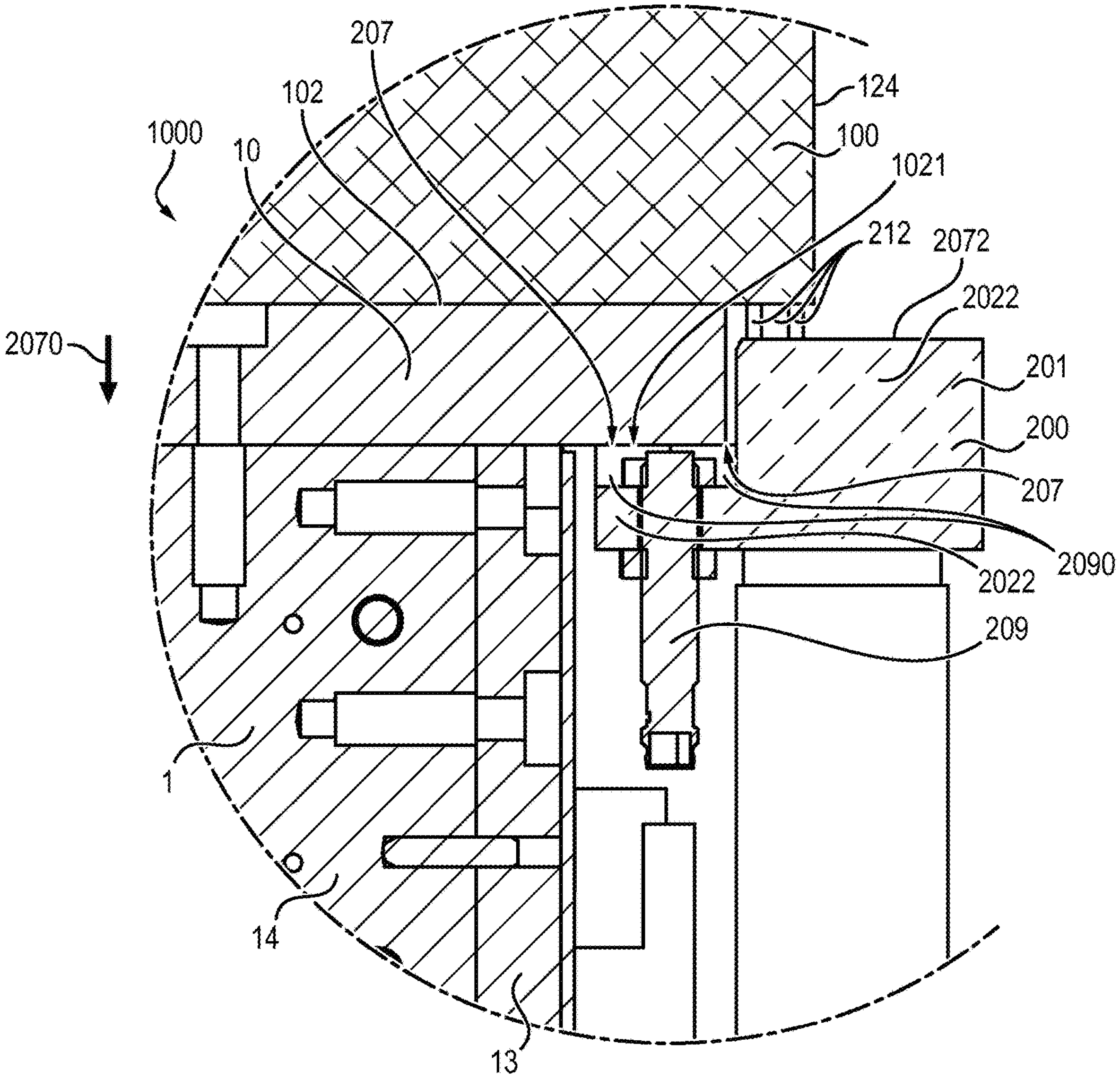
FIG. 3E represents an enlarged schematic cross section of the adapter, the reception support and the friction stir welding head according to embodiments of the invention across the section plane A shown on FIG. 3C.

The adapter 100 may be separated from the interface 400 in a dismounting position, as shown on FIG. 2.

The assembly 1000 may be in contact with the reception support 200 in the prescribed reception position of the adapter 100, as shown on FIGS. 2, 3A, 3B, 3C, 3D, 3E and 8.

The adapter 100 may be fixed to the interface 400 in the mounting position with a distance not null between the assembly 1000 and the reception support 200, as shown in FIGS. 4A, 4B, 4C.

The body 101 of the adapter 100 has a second surface 103 situated at a first prescribed distance not null from the first surface 102. The second surface 103 is a second outer surface 103 accessible from the outside. The body 101 of the adapter 100 may comprise outer walls 121, 122, 123, 124 attached on the one hand to the first surface 102 and on the other hand to the second surface 103.

One of the second surface 103 of the adapter 100 and of the interface 400 has actuatable gripping clamps 105. The other one of the second surface 103 of the adapter 100 and of the interface 400 has pull tabs 402. Each actuatable gripping clamp 105 has a gripping position for gripping the pull tabs and a releasing position for releasing the pull tabs 402. The actuatable gripping clamps 105 may each have a gripping position for gripping the pull tabs 402 when the pull tabs 402 are inserted in the actuatable gripping clamps 105. The actuatable gripping clamps 105 may each have a releasing position for releasing the pull tabs 402 when the pull tabs 402 are inserted in the actuatable gripping clamps 105. Each actuatable gripping clamp 105, when unactuated, is in the closed state or in the gripping position.

In the embodiments shown on the FIGS. 1 to 8, the interface 400 has the pull tabs 402 and the second surface 103 of the adapter 100 has the actuatable gripping clamps 105. The pull tabs 402 protrude from a surface 403 of the interface 400. The pull tabs 402 may be inserted in the actuatable gripping clamps 105 in the insertion direction 4020 shown on FIGS. 2 and 6. The actuatable gripping clamps 105 may be distributed on different parts of the second surface 103, in the same way as the pull tabs 402 distributed on different parts of the interface 400.

There may be provided four actuatable gripping clamps 105 on the second surface 103, such as for example an actuatable gripping clamp 105*a* on the rear and on the right of the second surface 103, an actuatable gripping clamp 105*a*' on the front and on the right of the second surface 103*a*, an actuatable gripping clamp 105*b* on the rear and on the left of the second surface 103 and an actuatable gripping clamp 105*b*' on the front and on the left of the second surface 103.

The rotating driving machine C can be a machine tool, for example a numerically-controlled machine tool M. The rotating driving machine C comprises a drive spindle B (or spindle nose B), which is rotatably mounted about a second axis AX2 of rotation with respect to the chassis 300. The rotating driving machine C has a motor to cause rotation of the drive spindle B about the second axis AX2 of rotation. The drive spindle B runs through an opening 405 of the surface 403 of the interface 400.

The friction stir welding head 1 has a frame comprising the upper wall 10, a first lateral wall 11 fixed to the upper wall 10 on the right, a second lateral wall 12 fixed to the upper wall 10 on the left, a front wall 13 fixed to the upper wall 10 on the front and a rear wall 14 fixed to the upper wall 10 on the rear.

Figure 11:
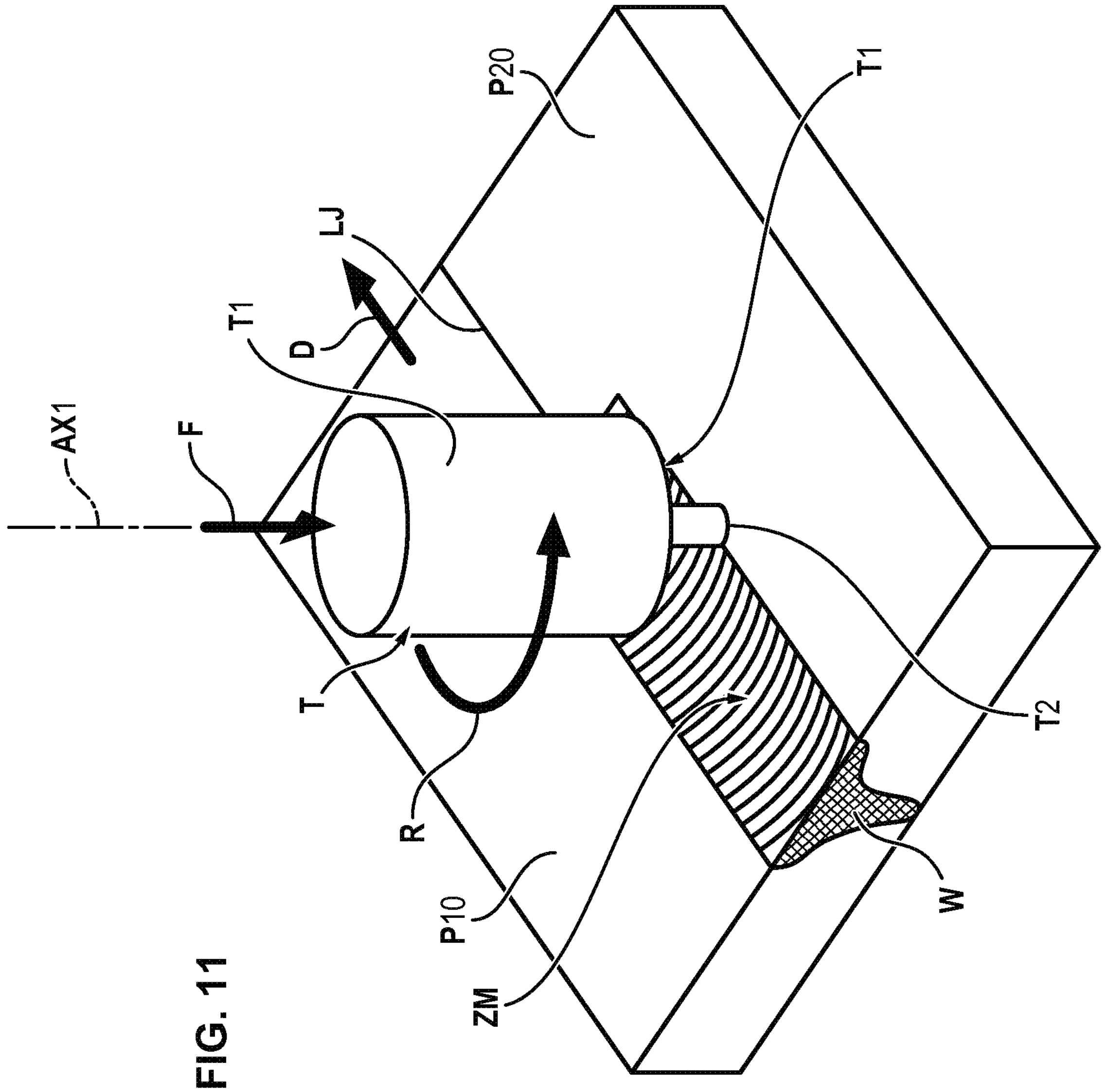
FIG. 11 represents a schematic perspective view of a friction stir welding tool which can be used by friction stir welding head according to embodiments of the invention.

As shown on FIG. 11, a friction stir welding tool T having to be driven in rotation R about a first axis of rotation AX1 relatively to the frame can be mounted on a tool securing part 16 of the head 1. This friction stir welding tool T may comprise a peripheral shoulder T1 and a central pin T2, which is surrounded by the peripheral shoulder T1 about the first axis of rotation AX1 and which protrudes or is able to protrude from the peripheral shoulder T1 along the first axis of rotation AX1. The tool securing part 16 of the head 1 protrudes from the ends of the walls 11, 12, 13 and 14, which are remote from the wall 10 frame, i.e. from the bottom of these walls on the figures. The friction stir welding head 1 has a rotary drive shaft 15, to drive in rotation the tool securing part 16, and therefore the tool T, the peripheral shoulder T1 and the central pin T2 about the first axis of rotation AX1, when this tool T is mounted on the tool securing part 16.

The adapter 100 has a passage 114 in the second surface 103, between the outer walls 121, 122, 123, 124*l* and in the first surface 102. When the adapter 100 has ben put previously in the mounting position of the assembly 1000, the drive spindle B is positioned in the passage of the adapter 100 and runs through the adapter 100. The head 1 has an input drive shaft rotatably mounted about the first axis of rotation AX1 and rotatably mounted in the frame. The input drive shaft and the drive spindle B have gears meshing with each other in the mounting position of the assembly 1000, so that the rotation of the drive spindle B about the second axis AX2 of rotation causes rotation of the input drive shaft about the first axis of rotation AX1. The head 1 has in the frame a mechanism by which rotation of the input drive shaft about the first axis of rotation AX1 causes rotation of the rotary drive shaft 15, to drive in rotation the tool securing part 16, and therefore the tool T, the peripheral shoulder T1 and the central pin T2 about the first axis of rotation AX1, when this tool T is mounted on the tool securing part 16.

As represented in FIG. 11, the friction stir welding may be performed by the friction stir welding head 1, on the tool securing part 16 of which the friction stir welding tool T is fixed. The friction stir welding may be performed by rotating the peripheral shoulder T1 and the central pin T2 about the first axis of rotation AX1 (along the arrow R), to make the central pin T2 get into two (or more than two) pieces to be welded or workpieces P10 and P20, until making the shoulder T1 abut against these pieces P10 and P20, then by displacing the tool T along a prescribed path D along a joint line LJ to perform the friction stir welding W. The piece P10 can be placed next to the piece P20 to perform an edge-to-edge welding of these pieces P10 and P20, as represented in FIG. 11, or below the piece P20 in order to perform a transparency welding, where the tool T totally or partially passes through the part P20 in the latter case, or in another configuration. The rotation of the tool T therefore creates an area ZM for mixing the material of the pieces P10 and P20. The friction stir welding requires a rotational movement R, a forward movement D and a forging force F.

The adapter 100 comprises an actuation connector 106, which may be actuated in a gripping actuation state or in a release actuation state. The actuation connector 106 actuated in the gripping actuation state closes the actuatable clamps 105 from the releasing position to a closed state of the actuatable clamps 105. When the pull tabs 402 have been inserted in the actuatable clamps 105, this closed state of the actuatable clamps 105 corresponds to the gripping position of the actuatable clamps 105, in which the actuatable clamps 105 grip the pull tabs 402, in order to fix the adapter 100 to the interface 400 in the mounting position.

The actuation connector 106 actuated in the release actuation state opens the actuatable clamps 105 from the gripping position to the releasing position, in order to enable the adapter 100 to be separated from the interface 400 in the dismounting position.

The actuation connector 106 is attached to the body 101 and is accessible from the outside. For example, the actuation connector 106 may be attached to the lateral outer wall 123 of the body 101 of the adapter 100. The actuation connector 106 is distant from the first surface 102.

The actuation connector 106 has an actuation input 108 oriented according to the prescribed reception direction 2070 going from the second surface 103 to the first surface 102.

The reception support 200 serves to receive the assembly 1000 in the prescribed reception position of the assembly 1000 relatively to the reception support 200. The reception support 200 comprises a support 201, a base 202 and struts 203, 204, 205, 206, which are secured to the support 201 and maintain the support 201 at a second prescribed distance not null from ends 2030, 2040, 2050, 2060 of the struts 203, 204, 205, 206. The reception support 200 may comprise a base 202 fixed to the ends 2030, 2040, 2050, 2060 of the struts 203, 204, 205, 206. The struts 203, 204, 205, 206 may be feet 203, 204, 205, 206. The struts 203, 204, 205, 206 may be spaced one from the other. The struts 203, 204, 205, 206 may be flexible or rigid. The base 202 may have a through hole 2020 for letting through it a part of the head 1 in the prescribed reception position of the assembly 1000. The insertion direction 4020 is the reception direction 2070 and is oriented in the same way as the reception direction 2070.

The support 201 has a reception surface 207 which is in contact with the assembly 1000 in the prescribed reception position of the assembly 1000.

In the embodiments shown on the FIGS. 2, 3A, 3B, 3C, 3D, 3E, the reception surface 207 is in contact with the wall 10 of the friction stir welding head 1 in the prescribed reception position of the assembly 1000. The reception surface 207 support 200 may be in a same plane. The reception support 200 may be fixed on a table so that the reception surface 207 is horizontal. The reception support 200 may also be fixed on a table so that the reception surface 207 is not horizontal.

For example, the wall 10 has a first shoulder 1021 protruding laterally to the outside to the right from the first lateral wall 11 and a second shoulder 1022 protruding laterally to the outside to the left from the second lateral wall 12. The first shoulder 1021 protrudes laterally from the outer lateral wall 122 to the right, and the second shoulder 1022 protrudes laterally from the outer lateral wall 124 to the left. The first shoulder 1021 and the second shoulder 1022 are in contact with the reception surface 207 of the reception support 200 in the prescribed reception position of the assembly 1000. So the first shoulder 1021 protrudes laterally to the outside on the right from the friction stir welding head 1 and the second shoulder 1022 protrudes laterally to the outside on the left from the friction stir welding head 1.

Figure 8:
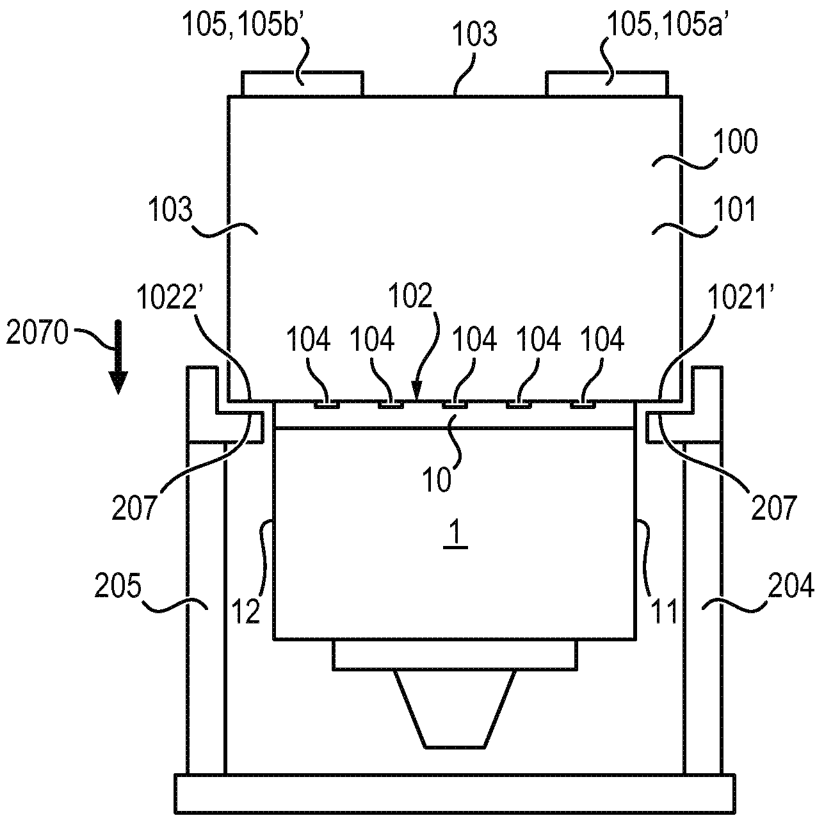
FIG. 8 represents an alternative embodiment of the adapter 100 according to the invention.

In another embodiment shown on FIG. 8, the reception surface 207 is in contact with a first shoulder 1021' of the first surface 102 of the adapter 100 and with a second shoulder 1022' of the first surface 102 of the adapter 100 in the prescribed reception position of the adapter 100 and of the assembly 1000. The first shoulder 1021' protrudes laterally to the outside to the right from the first lateral wall 11. The second shoulder 1022' protrudes laterally to the outside to the left from the second lateral wall 12.

In the embodiments shown on FIGS. 1C, 2, 3A, 3B, 3C, 3D, 3E, 4A, 4B, 4C, 5 and 8, the support 201 of the reception support 200 has a first arm 2011 (or segment 2011) on the right and a second arm 2012 (or segment 2012) on the left. In this example, in the prescribed reception position of the assembly 1000, the first shoulder 1021 or 1021' is in contact with the reception surface 207 of the first arm 2011 and the second shoulder 1022 or 1022' is in contact with the reception surface 207 of the second arm 2012. The first arm 2011 may be fixed between the strut 203 and the strut 204. The second arm 2012 may be fixed between the strut 205 and the strut 206. The support 201 of the reception support 200 has a third arm 2013 (or segment 2013 or transverse rear arm 2013) attached between the rear end of the first arm 2011 and the rear end of the second arm 2012. The third arm 2013 may be fixed between the strut 204 and the strut 206. So, the first arm 2011, the second arm 2012 and the third arm 2013 may form a support 201 having a U shape.

For example, the reception surface 207 of the first arm 2011 is delimited towards the outside to the right by a first protruding stop 2071 (or first protruding edge 2071) situated on the first arm 2011. For example, the reception surface 207 of the second arm 2012 is delimited towards the outside to the left by a second protruding stop 2072 (or second protruding edge 2072) situated on the second arm 2012. In the prescribed reception position of the assembly 1000 relatively to the reception surface 207, the first shoulder 1021 or 1021' faces the first protruding stop 2071 to the right and to the outside, and the second shoulder 1022 or 1022' faces the second protruding stop 2072 to the left and to the outside. In the prescribed reception position of the assembly 1000 relatively to the reception surface 207, the wall 10 is situated between the first protruding stop 2071 and the second protruding stop 2072.

An opening 213 is provided in the support 201, for example in the form of a space 213 between the first arm 2011, the second arm 2012 and the third arm 2013. A space 214 connected to the opening 213 is provided between the struts 203, 204, 205, 206. In the prescribed reception position of the assembly 1000 relatively to the reception surface 207, the friction stir welding head 1 is housed in the opening 213 and in the space 214. In the above example shown on the FIGS. 1C, 2, 3A, 3B, 3C, 3D, 3E, 4A, 4B, 4C, 5 and 8, the wall 10, the first shoulder 1021 or 1021' and the second shoulder 1022 or 1022' are also housed in the opening 213 in the prescribed reception position.

The reception support 200 comprises a triggering connector 208, which is attached to the support 201 and which is accessible from the outside. The triggering connector 208 may be on a free surface 2080 of the support 201 in the prescribed reception position of the assembly 1000. For example, the triggering connector 208 may be situated at a distance not null from the reception surface 207. For example, the triggering connector 208 may be at a greater distance (or height) from a reference plane 2021, in which the ends 2030, 2040, 2050, 2060 are situated (for example the plane 2021 of the base 202), than the reception surface 207. The triggering connector 208 may be on the free surface 2080 of the support 201, for example on the third arm 2013 as shown on the FIGS. 1C, 2, 3A, 3B, 3C, 3D, 3E, 4A, 4B, 4C, 5 and 8. Of course, in other embodiments, the triggering connector 208 may be on another free surface of the support 201, for example on the first protruding stop 2071 or on the second protruding stop 2072.

The triggering connector 208 is disposed on the support 201, such that when the assembly 1000 is in contact with the reception surface 207 in the prescribed reception position, the triggering connector 208 is in contact with the actuation connector 106 and is able to control the actuation connector 106 in one of the gripping actuation state and of the release actuation state.

The triggering connector 208 has an actuation output 215 which is oriented against the prescribed reception direction 2070 going from the second surface 103 to the first surface 102. In the prescribed reception position of the assembly 1000 relatively to the reception surface 207, the actuation input 108 is in contact with the actuation output 215.

In an embodiment, shown in FIGS. 1C, 2, 3A, 3B, 3C, 3D, 3E, 4A, 4B, 4C, 5 and 8, the reception support 200 may have one (or more) centering pin, for example two centering pins 211, 212. The centering pins 211, 212 protrude from the reception support 200 against the prescribed reception direction 2070. The adapter 100 comprises one (or more) rim 113 protruding laterally to the outside from the first surface 102, such as for example a rim 113 protruding to the right of outer lateral wall 122 and another rim 113 protruding to the left of outer lateral wall 124. Each rim 113 has one (or more) recess 111 or 112 or through hole 111 or 112 for centering the adapter 100 in the prescribed reception position of the assembly 1000. The recess 111, 112 is oriented according to the prescribed reception direction 2070 going from the second surface 103 to the first surface 102. In the prescribed reception position of the assembly 1000 relatively to the reception surface 207, the centering pins 211, 212 are inserted in respectively the recess 111, 112 of the adapter 100.

According to one embodiment of the invention, shown in FIGS. 1C, 2, 3A, 3B, 3C, 3D, 3E, 4A, 4B, 4C, 5, 7 and 8, the reception support 200 comprises one (or more) first sensor 209 for sensing that the assembly 1000 is in the prescribed reception position relatively to the reception surface 207. For example, two first sensors 209 may be provided, for example one first sensor 209 on the first arm 2011 and one other first sensor 209 on the second arm 2012. Of course, only one first sensor 209 may be provided, as shown by the interrupted lines of FIG. 7. The one or more first sensor 209 may be situated at the level or be flush with the reception surface 207. As shown on FIGS. 4C and 3D, the one or more first sensor 209 may be partly or fully situated in the support 201 under the reception surface 207. A recess 2090 may be provided in the reception surface 207 around the one or more first sensor 209. The one or more first sensor 209 may be proximity sensor sensible to the presence of the wall 10 facing the one or more first sensor 209 in the prescribed reception position relatively to the reception surface 207.

According to one embodiment of the invention, shown in FIGS. 1C, 2, 3A, 3B, 3C, 3D, 3E, 4A, 4B, 4C, 5, 7 and 8, the reception support 200 comprises one (or more) second sensor 210 for sensing that the interface 400 is at less than a third prescribed distance D3 being not null from the second sensor 210. For example, the second sensor 210 may be a laser sensor projecting a laser beam against the prescribed reception direction 2070. For example, the second sensor 210 may be configured to measure a distance of the interface 400 to the second sensor 210. The second sensor 210 may be attached to a distance not null from the reception surface 107 and to an outer surface of the reception support 200, for example of the third arm 2013, so as to be distant from the adapter 100 in the prescribed reception position relatively to the reception surface 207.

According to one embodiment of the invention, the third prescribed distance D3 is higher than a fourth prescribed distance D4, which is present from the interface 400 to the second sensor 210*n* the prescribed reception position of the assembly 1000 relatively to the reception surface 207, when the actuatable clamps 105 are in the gripping position of the pull tabs 402.

In the embodiments shown in the FIGS. 1A, 1B, 1C, 2, 3A, 3B, 3C, 3D, 3E, 4A, 4B, 4C, 5, 6, 7, 8, the actuatable gripping clamps 105 are actuatable by a pressurized fluid from the actuation connector 106. This pressurized fluid may be, for example, compressed air, or other. Of course, in other embodiments not shown, the actuatable gripping clamps 105 may be actuatable by other means than pressurized fluid. For example, in other embodiments not shown, the actuatable gripping clamps 105 are electrically or electro-mechanically actuatable.

In the embodiments shown in the FIGS. 1A, 1B, 1C, 2, 3A, 3B, 3C, 3D, 3E, 4A, 4B, 4C, 5, 6, 7, 8, the actuation connector 106 has the actuation input 108 (or input port 108) for receiving the pressurized fluid. The adapter 100 has channels 109, 3220 for sending the pressurized fluid from the actuation connector 106 to the actuatable gripping clamps 105. When no pressurized fluid is sent in the actuation input 108, the actuation connector 106 is in the gripping actuation state, enabling the actuatable gripping clamps 105 to grip the pull tabs 402 when the pull tabs 402 have been previously inserted in the actuatable gripping clamps 105. When the pressurized fluid is sent in the actuation input 108, the actuation connector 106 is in the release actuation state, enabling the actuatable gripping clamps 105 to release the pull tabs 402 when the pull tabs 402 have been previously inserted in the actuatable gripping clamps 105.

In the embodiments shown in the FIGS. 1A, 1B, 1C, 2, 3A, 3B, 3C, 3D, 3E, 4A, 4B, 4C, 5, 6, 7, 8, the triggering connector 208 has the actuation output 215 for sending the pressurized fluid. The actuation output 215 is connected in a fluid tight manner to the actuation input 108 of the actuation connector 106 in the prescribed reception position of the assembly 1000 relatively to the reception surface 207. For example, the actuation input 108 is inserted in the actuation output 215 in the prescribed reception position of the assembly 1000 relatively to the reception surface 207. The actuation input 108 may slide in the actuation output 215 on a certain length along the prescribed reception direction 2070, when approaching the prescribed reception position of the assembly 1000 relatively to the reception surface 207.

Figure 6:
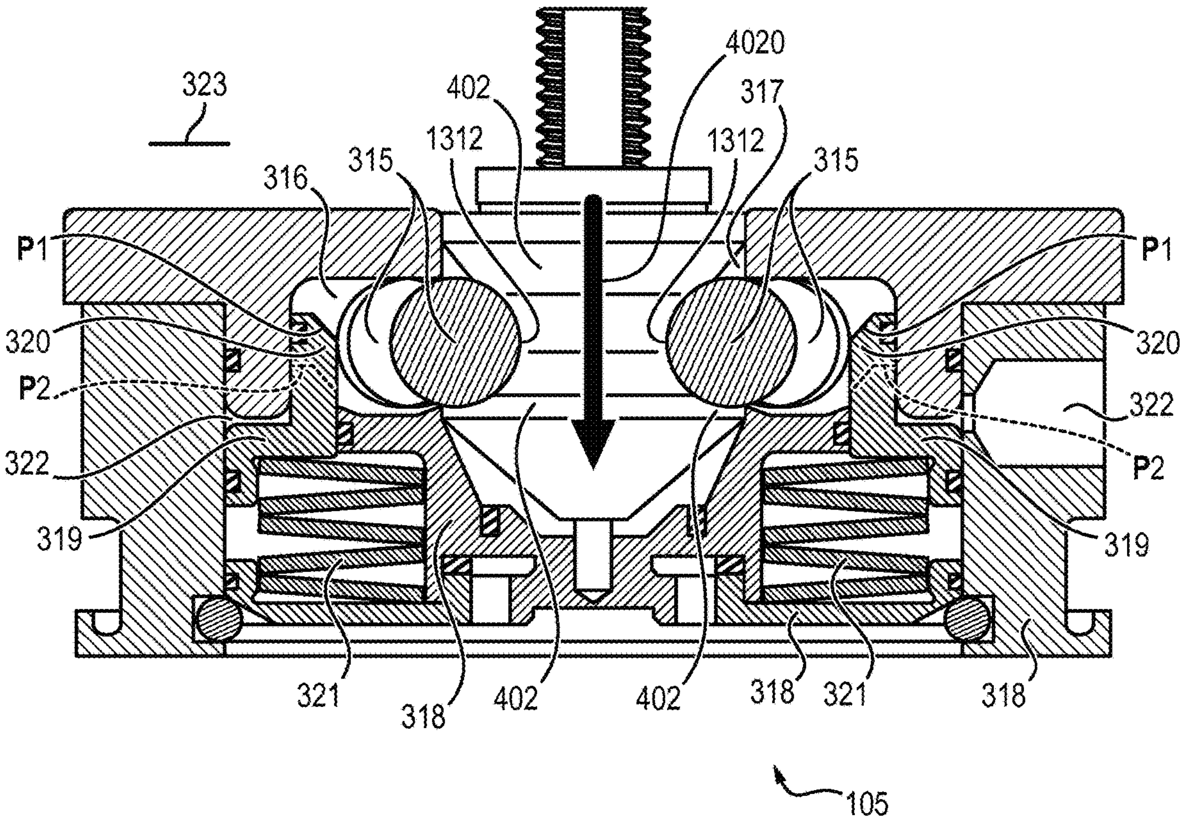
FIG. 6 represents a schematic perspective view of an actuatable gripping clamp of the adapter according to embodiments of the invention.
Figure 7:
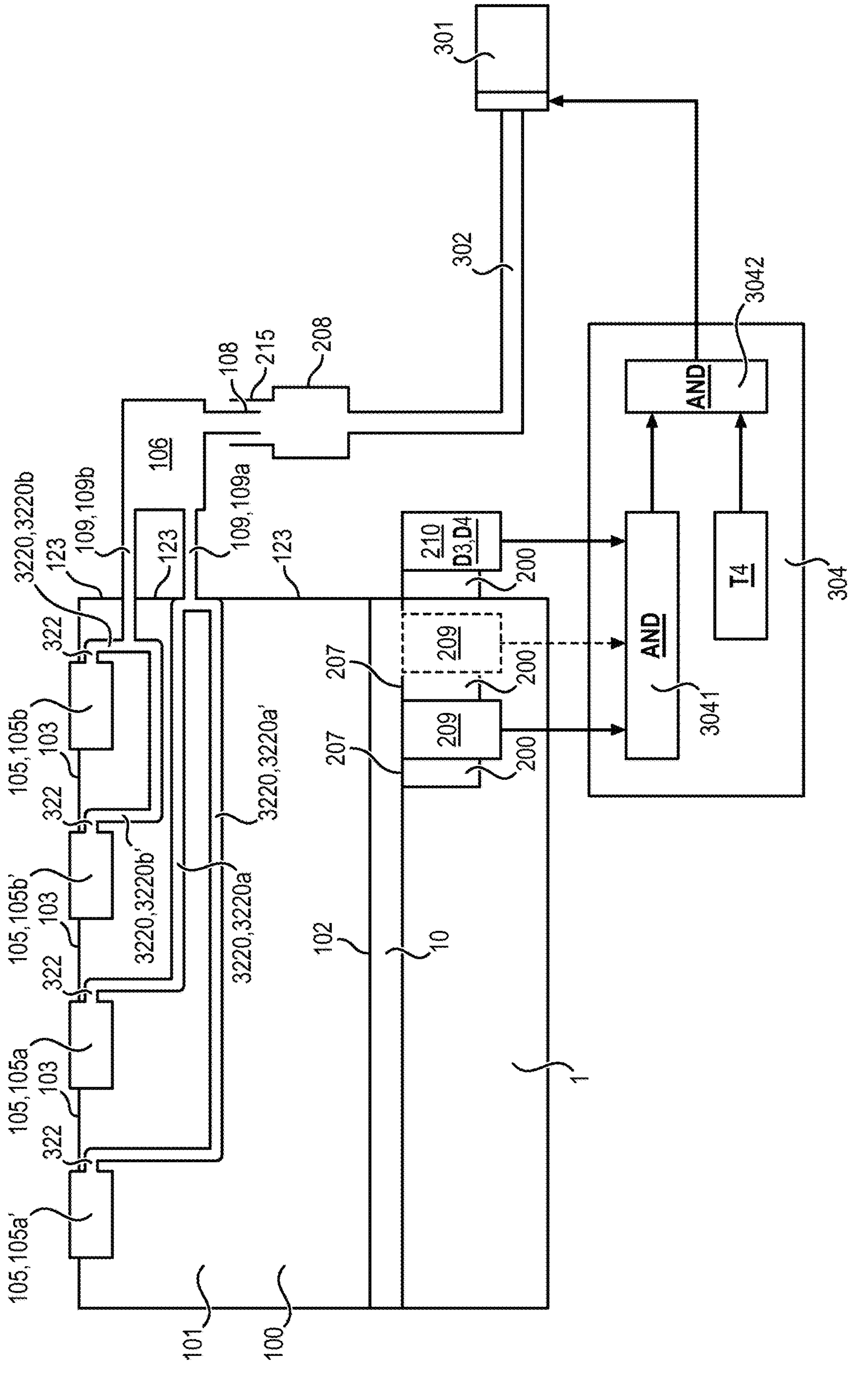
FIG. 7 represents a schematic circuit for controlling the clamps of the adapter according to embodiments of the invention.

According to one embodiment of the invention, shown in FIGS. 6 and 7, each actuatable gripping clamp 105 comprises a pressurized fluid supply inlet 322. As shown on FIG. 7, the fluid supply inlets 322 of the actuatable gripping clamps 105 are connected to inner channels 3320 situated inside the body 101 (i.e. between the outer walls 121, 122, 123, 124). The inner channels 3320 are connected to the one or more outer channel 109, which is/are situated out of the lateral outer wall 123 and which run through of the lateral outer wall 123. For example, an outer channel 109*a* on the right is connected to the actuatable gripping clamp 105*a* through an inner rear channel 3320*a* and to the actuatable gripping clamp 105*a*' through an inner rear channel 3320*a*'. For example, an outer channel 109*b* on the left is connected to the actuatable gripping clamp 105*b* through an inner rear channel 3320*b* and to the actuatable gripping clamp 105*b*' through an inner rear channel 3320*b'*.

According to one embodiment of the invention, shown in FIG. 7, the reception support 200 is part of an installation 300 comprising a source 301 of pressurized fluid, a conduit 302 for transporting the pressurized fluid from the source 301 to the actuation output 215 and a source controller 304 for controlling the sending of the pressurized fluid from the source 301 to the conduit 302. The source controller 304 may control an input of the source 301 to start it or to stop it, or may control a valve of pressurized fluid interposed between the source 301 and the conduit 302 or on the conduit 302. The source controller 304 may be or comprise a computer.

The source controller 304 is configured to control the source 301 for a determined duration T4 (being not null) in the sending position corresponding to the release actuation state of the actuation connector 106, in which the source 301 sends the pressurized fluid to the actuation output 215, when both of a first condition in which the first sensor 209 senses that the assembly 1000 is in the prescribed reception position relatively to the reception surface 207, and a second condition, in which the second sensor 210 senses that the interface 400 is at less than the third prescribed distance D3 from the second sensor 210, are met. The determined duration T4 may be more than 1 second, for example from 1 to 10 seconds.

The source controller 304 is configured to control the source 301 in an interrupting position corresponding to the gripping actuation state of the actuation connector 106, in which the source 301 does not send the pressurized fluid to the actuation output 215, when the first sensor 209 senses that the assembly 1000 is not in the prescribed reception position relatively to the reception surface 207, and/or when the second sensor 210 senses that the interface 400 is not at less than the third prescribed distance D3 from the second sensor 210.

For example, the source controller 304 comprises a first AND logical gate 3041 receiving the first detection signals (which are for example a logical 1 in case that the first sensor(s) 209 detects that the assembly 1000 is in the prescribed reception position relatively to the reception surface 207, and which are a logical 0 in case that the first sensor(s) 209 does not detect that the assembly 1000 is in the prescribed reception position relatively to the reception surface 207) of the first sensor(s) 209 and the second detection signals (which are for example a logical 1 in case that the second sensor 210 detects that the interface 400 is at less than the third prescribed distance D3 from the second sensor 210, and which are a logical 0 in case that the second sensor 210 detects that the interface 400 is not at less than the third prescribed distance D3 from the second sensor 210) of the second sensor 210. The source controller 304 comprises another AND logical gate 3042 receiving the output of the first AND logical gate and the determined duration T4. The other AND logical gate 3042 thus sends to the source 301 the sending position, corresponding to the logical 1 at the output of the first AND logical gate, with the determined duration T4, only when both the first and second conditions are met, i.e. when both the first and second detection signals are a logical 1. The other AND logical gate 3042 thus sends to the source 301 the interrupting position, corresponding to the logical 0 at the output of the first AND logical gate, when the first and/or second condition is not met, i.e. when the first and/or second detection signals are a logical 0. The first AND logical gate 3041, the other AND logical gate 3042 and the determined duration T4 may be made by a computer.

According to an embodiment of the invention, shown in FIG. 6, each pull tab 402 has a recess 1312. Each actuatable gripping clamp 105 is of the type of a module clamping balls 315 constrained by a spring 321 against the recess 1312 for gripping the pull tab 402 in the gripping position P1 for gripping the pull tab 402. The actuatable gripping clamp 105 comprises a housing 318 having a conduit 316 in which the balls 315 are movable. The housing 318 has a hole 317 for receiving the pull tab 402 in the actuatable gripping clamp 105. The conduit 316 communicates with the hole 317. Each actuatable gripping clamp 105 comprises a piston 319 slidably mounted in the housing 318 and the spring 321 compressed between the housing 318 and the piston 319. The piston 319 is slidable along the insertion direction 4020. The piston 319 is integral with an outer tab 320 located in the conduit 316. The outer tab 320 is oblique to the transverse direction 323 of the conduit 316 going to the hole 317 and is oblique to the insertion direction 4020, so that movement of the piston 319 against the insertion direction 4020 is converted to movement of the balls 315. The outer tab 320 is configured to push the balls 315 into the hole 317 under the biasing force exerted by the spring 321 on the piston 319 so that the balls 315 protrude into the hole 317 and are locked against the recess 1312 of the pull tab 402, which represents the gripping position P1 of the pull tab 402, when the pull tab 402 has been inserted into the hole 317 in the insertion direction 4020. Each actuatable gripping clamp 105 includes the fluid supply inlet 322 for sending the pressurized fluid against the piston 319 and against the spring 321. This pressurized fluid may be, for example, compressed air. The sending of the pressurized fluid into the fluid supply inlet 322 moves the piston 319 against the spring 321 to move the outer tab 320 away from the balls 315, which allows the balls 315 to move away from the hole 317 and away from the recess 1312 and thus to move the balls 315 into the position P2 of releasing the pull tab 402.

Figure 9:
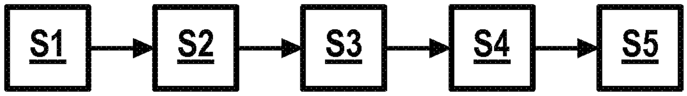
FIG. 9 represents an organigram of method for mounting a friction stir welding head on a chassis of a rotating driving machine according to the invention.

In FIG. 9, a method for mounting the friction stir welding head 1 on the chassis 300 of the rotating driving machine C uses the equipment kit described above. The interface 400 is initially fixed to the chassis 300 of the rotating driving machine C with the interface 400 situated at a distance from the adapter 100. The assembly 100 is initially in contact with the reception surface 207 of the reception support 200 in the prescribed reception position on the reception support 200, as shown on FIG. 2A, so that the first sensor 209 detects this prescribed reception position.

The mounting method comprises the following steps S1, S2, S3, S4, S5.

In the step S1, the chassis 300 of the rotating driving machine C and the reception support 200 are moved one relative to the other, so that the interface 400 faces the second face 103 of the adapter 100.

For example, in a general manner in the methods according to the invention, the reception support 200 may be moved in the two directions of an horizontal plane of a table, to which the reception support 200 has been fixed, and the chassis 300 of the rotating driving machine C may be moved vertically and inclined relative to the vertical about one or more rotation axis. The movements of the chassis 300 and of the table may be controlled by a computer.

In the step S2, the triggering connector 208 is controlled to put the actuation connector 106 in the release actuation state for the determined duration T4 being not null. This can be triggered by the second sensor 210 sensing that the interface 400 is at less than the third prescribed distance D3 from the second sensor 210, with the first sensor 209 still detecting the prescribed reception position of the assembly 100 relatively to the reception surface 207.

In the step S3, the chassis 300 of the rotating driving machine C and the reception support 200 are moved one relative to the other, so that the pull tabs 402 of the interface 400 are inserted in the actuatable clamps 105 of the adapter 100 during this determined duration T4, while the assembly 1000 is still in the prescribed reception position relatively to the reception surface 207 as shown on FIGS. 3A, 3B, 3C, 3D and 3E. So the steps S2 and S3 are carried out partly in the same time.

In the step S4, the triggering connector 208 is controlled to put the actuation connector 106 in the gripping actuation state once the determined duration T4 has elapsed, while the assembly 1000 is still in the prescribed reception position relatively to the reception surface 207. The actuatable clamps 105 thus grip the pull tabs 402 in the gripping position, while the assembly 1000 is still in the prescribed reception position relatively to the reception surface 207 as shown on FIGS. 3A, 3B, 3C, 3D and 3E. The adapter 100 is thus secured to the interface 400 by the actuatable clamps 105 gripping the pull tabs 402.

In the step S5, the chassis 300 of the rotating driving machine C and the reception support 200 are moved one relative to the other, so that the chassis 300 of the rotating driving machine C with the adapter 100 secured to the interface 400 is moved away from the reception support 200, as shown on FIG. 4C.

Figure 10:
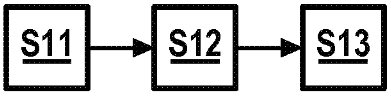
FIG. 10 represents an organigram of method for dismounting a friction stir welding head from a chassis of a rotating driving machine according to the invention.

In FIG. 10, a method for dismounting the friction stir welding head 1 from the chassis 300 of a rotating driving machine C uses the equipment kit described above. The interface 400 is initially fixed to the chassis 300 of the rotating driving machine C and the adapter 100 is initially secured to the interface 100 by the fact that the actuatable gripping clamps 105 of the adapter 100 are initially gripping the pull tabs 402 of the interface 400 in the gripping position. The assembly 1000 is not initially in the prescribed reception position relatively to the reception surface 207, as shown on FIG. 4C.

The dismounting method comprises the following steps S11, S12, S13.

In the step S11, the chassis 300 of the rotating driving machine C and the reception support 200 are moved one relative to the other, so that the assembly 1000 is brought in contact with the reception surface 207 in the prescribed reception position of the assembly 1000, as shown on FIGS. 3A, 3B, 3C, 3D and 3E.

In the step S12, the triggering connector 208 is controlled to put the actuation connector 106 in the release actuation state for the determined duration T4 being not null. This can be triggered by the second sensor 210 sensing that the interface 400 is at less than the third prescribed distance D3 from the second sensor 210, with the first sensor 209 detecting the prescribed reception position of the assembly 100 relatively to the reception surface 207. The actuatable clamps 105 thus release the pull tabs 402 in the releasing position.

In the step S13, the chassis 300 of the rotating driving machine C and the reception support 200 are moved one relative to the other, to bring the pull tabs 402 of the interface 400 away from the actuatable clamps 105 of the adapter 100 during the determined duration T4, as shown on FIG. 2A. Once the determined duration T4 has elapsed, the triggering connector 208 is controlled to put the actuation connector 106 in the gripping actuation state. However, the pull tabs 105 are not inserted anymore in the actuatable gripping clamps 105. Thus, the assembly 1000 remains in the prescribed reception position of the assembly 100 relatively to the reception surface 207 on the reception support 200.

In other embodiments not shown on the figures, the interface 400 has the actuatable gripping clamps 105, and the second surface 103 of the adapter 100 has the pull tabs 402. In this case, the first sensor 209, the second sensor 210 and the reception support 200 as described above may be provided. The actuatable gripping clamps 105 may be actuatable by pressurized fluid, in which case the source 300 of pressurized fluid and the source controller 304 as described above may be provided, or the actuatable gripping clamps may be electrically or electro-mechanically actuatable. The source 300 of pressurized fluid may be connected to the actuatable gripping clamps 105. The connectors 206, 208 may not be provided.

Of course, the embodiments, characteristics, possibilities and examples described above can be combined with each other or selected independently of each other. Of course, the parts mentioned above may be other than the embodiments described above.

The invention claimed is:

1. An equipment kit for mounting and dismounting a friction stir welding head, the equipment kit comprising an adapter intended to be fixed to the friction stir welding head and an interface intended to be fixed to a chassis of a rotating driving machine, wherein the adapter comprises a body having a first surface having fasteners intended to be secured to the friction stir welding head and a second surface situated at a first prescribed distance not null from the first surface, wherein one of the second surface of the adapter has actuatable gripping clamps having each a gripping position for gripping pull tabs of the interface and a releasing position for releasing the pull tabs, wherein the adapter further comprises an actuation connector to open the actuatable gripping clamps from the gripping position to the releasing position and to close the actuatable gripping clamps from the releasing position to the gripping position. wherein the actuation connector is able be actuated to take one of a gripping actuation state, in which the gripping actuatable gripping clamps are in the gripping position, and of a release actuation state, in which the gripping actuatable gripping clamps are in the releasing position, wherein the actuation connector is attached to the body and is accessible from the outside, the actuatable gripping clamps are actuatable by pressurized fluid from the actuation connector, wherein the actuation connector has an actuation input for receiving the pressurized fluid, wherein the adapter has channels for sending the pressurized fluid from the actuation connector to the actuatable gripping clamps, wherein an absence of the pressurized fluid in the actuation input corresponds to the gripping actuation state of the actuation connector, wherein a presence of the pressurized fluid in the actuation input corresponds to the release actuation state of the actuation connector.

2. The equipment kit according to claim 1, wherein the adapter comprises at least one rim protruding laterally to the outside from the first surface, wherein the at least one rim has at least one recess for centering the adapter, wherein the at least one recess is oriented according to a prescribed reception direction going from the second surface to the first surface.

3. The equipment kit according to claim 1, further comprising a friction stir welding head secured by the fasteners to the first surface of the adapter of the equipment kit.

4. The equipment kit according to claim 3, wherein the friction stir welding head secured by the fasteners to the first surface of the adapter forms an assembly, the friction stir welding head has an upper wall secured by the fasteners to the second surface of the adapter, a first lateral wall fixed to the upper wall on the right and a second lateral wall fixed to the upper wall on the left, wherein the upper wall or the first surface of the adapter has a first shoulder protruding laterally to the outside to the right from the first lateral wall and a second shoulder protruding laterally to the outside to the left from the second lateral wall, the first shoulder and the second shoulder serving as contact surfaces for the assembly formed by the friction stir welding head secured by the fasteners to the first surface of the adapter in a prescribed reception position of the assembly.

5. A reception support for receiving the assembly of an equipment kit according to claim 4, wherein the reception support comprises a support and struts, which are secured to the support to maintain the support at a second prescribed distance from ends of the struts, wherein the support has a reception surface intended to be in contact with the contact surfaces of the assembly in the prescribed reception position of the assembly, wherein the support has an opening and a space connected to the opening is provided between the struts, to house the friction stir welding head in the opening and in the space in the prescribed reception position of the assembly, wherein the reception support comprises a triggering connector, which is attached to the support and which is accessible from the outside, wherein in the prescribed reception position of the assembly relatively to the reception surface the triggering connector is in contact with the actuation connector and is able to control the actuation connector in one of the gripping actuation state and of the release actuation state, wherein the triggering connector has an actuation output, which is connected in a fluid tight manner to the actuation input of the actuation connector in the prescribed reception position of the assembly relatively to the reception surface.

6. The reception support according to claim 5, wherein the support has a free surface, which is distant from the reception surface, wherein the triggering connector is situated on the free surface of the support and the actuation output is oriented against a prescribed reception direction.

7. The reception support according to claim 5, wherein the actuation output is oriented against a prescribed reception direction going from the second surface to the first surface and which is in contact with an input port of the actuation connector in the prescribed reception position of the assembly relatively to the reception surface.

8. The reception support according to claim 5, wherein the reception support comprises at least one first sensor for sensing that the assembly is in the prescribed reception position relatively to the reception surface.

9. The reception support according to claim 5, wherein the reception support comprises at least one second sensor for sensing that an interface intended to be fixed to the chassis of the rotating driving machine is at less than a third prescribed distance being not null from the second sensor.

10. The reception support according to claims 5, wherein the reception support comprises at least one first sensor for sensing that the assembly is in the prescribed reception position relatively to the reception surface, wherein the reception support comprises at least one second sensor for sensing that an interface intended to be fixed to the chassis of the rotating driving machine is at less than a third prescribed distance being not null from the second sensor, wherein the reception support is part of an installation comprising a source of pressurized fluid, a conduit for transporting the pressurized fluid from the source to the actuation output and a source controller for controlling the sending of the pressurized fluid from the source to the conduit, wherein the source controller is configured to control the source for a determined duration being not null in a sending position corresponding to the release actuation state of the actuation connector, in which the source sends the pressurized fluid to the actuation output, when both of a first condition in which the at least one first sensor senses that the assembly is in the prescribed reception position relatively to the reception surface, and a second condition, in which the second sensor senses that the interface intended to be fixed to the chassis of the rotating driving machine is at less than the third prescribed distance from the second sensor, are met, wherein the source controller is configured to control the source in an interrupting position corresponding to the gripping actuation state of the actuation connector, in which the source does not send the pressurized fluid to the actuation output, when the first condition is not met and/or the second condition is not met.

11. The reception support according to claim 5, wherein the support has a first protruding stop delimiting towards the outside the reception surface to the right and a second protruding stop delimiting towards the outside the reception surface to the left.

12. The reception support according to claim 5, wherein the reception support has at least one centering pin, which is protruding from the reception support against a prescribed reception direction and which is intended to be inserted in the at least one recess of the adapter in a prescribed reception position of the friction stir welding head or of the adapter relatively to the reception surface.

13. A mounting device comprising the equipment kit according to claim 4 and the reception support according to claim 5.

14. The mounting device according to claim 13, wherein the pull tabs are attached to and protrude from the interface and are able to be inserted in the actuatable gripping clamps, when the actuatable gripping clamps are in the release position, wherein in the gripping position the actuatable gripping clamps are configured to grip the pull tabs inserted in the actuatable gripping clamps.

15. The mounting device according to claim 14, wherein the reception support comprises at least one second sensor for sensing that an interface intended to be fixed to the chassis of the rotating driving machine is at less than a third prescribed distance being not null from the second sensor, wherein the third prescribed distance is higher than a fourth prescribed distance, which is present from the interface to the second sensor in the prescribed reception position of the assembly relatively to the reception surface, when the actuatable gripping clamps are in the gripping position of the pull tabs.

16. A method for mounting a friction stir welding head on a chassis of a rotating driving machine, using mounting device according to claim 14 wherein the interface is initially fixed to the chassis of the rotating driving machine at a distance not null from the adapter and the assembly is initially in contact with the reception surface of the reception support in the prescribed reception position, wherein the method comprises the following steps:

moving the chassis of the rotating driving machine and the reception support one relative to the other, so that the interface faces the second face of the adapter, controlling the triggering connector to put the actuation connector in the release actuation state for a determined duration being not null, inserting the pull tabs of the interface in the actuatable gripping clamps of the adapter during the determined duration, controlling the triggering connector to put the actuation connector in the gripping actuation state after the determined duration, moving the chassis of the rotating driving machine and the reception support one relative to the other, so that the chassis of the rotating driving machine with the adapter secured to the interface is away from the reception support.

17. The method of claim 16, wherein the reception support comprises at least one second sensor for sensing that an interface intended to be fixed to the chassis of the rotating driving machine is at less than a third prescribed distance being not null from the second sensor, wherein the third prescribed distance is higher than a fourth prescribed distance, which is present from the interface to the second sensor in the prescribed reception position of the assembly, wherein said controlling is triggered by the second sensor sensing that the interface is at less than the third prescribed distance being not null from the second sensor.

18. A method for dismounting a friction stir welding head from a chassis of a rotating driving machine, using a mounting device according to claim 14, wherein the interface is initially fixed to the chassis of the rotating driving machine and the adapter is initially secured to the interface by the fact that the actuatable gripping clamps of the adapter are initially gripping the pull tabs of the interface in the gripping position, and wherein the assembly is not initially in the prescribed reception position relatively to the reception surface, wherein the method comprises the following steps:

moving the chassis of the rotating driving machine and the reception support one relative to the other, so that the assembly is in contact with the reception surface in the prescribed reception position of the assembly, controlling the triggering connector to put the actuation connector in the release actuation state for a determined duration being not null, moving the chassis of the rotating driving machine and the reception support one relative to the other, to bring the pull tabs of the interface away from the actuatable gripping clamps of the adapter during the determined duration.

19. The method of claim 18, wherein said controlling is triggered by a first sensor of the reception support sensing that the assembly is in the prescribed reception position relatively to the reception surface.

* * * * *